United States Patent
Breeden, III et al.

(10) Patent No.: US 12,188,592 B2
(45) Date of Patent: *Jan. 7, 2025

(54) EXPANDABLE HOSE

(71) Applicant: Winston Products LLC, Cleveland, OH (US)

(72) Inventors: Winston H. Breeden, III, Chagrin Falls, OH (US); Troy Hatcher, Bay Village, OH (US); Grant Hauk, Burlington, OH (US); Rick Gyure, Willoughby, OH (US); Curtis Taylor, Chagrin Falls, OH (US); Mat Hanson, Lakewood, OH (US); Aaron Misener, Lakewood, OH (US); Bob Mergenhagen, Chagrin Falls, OH (US)

(73) Assignee: Winston Products LLC, Cleveland, OH (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/073,832

(22) Filed: Dec. 2, 2022

(65) Prior Publication Data

US 2023/0175622 A1    Jun. 8, 2023

Related U.S. Application Data

(60) Provisional application No. 63/286,027, filed on Dec. 4, 2021.

(51) Int. Cl.
*F16L 33/01* (2006.01)
*F16L 11/20* (2006.01)
(Continued)

(52) U.S. Cl.
CPC .............. *F16L 33/01* (2013.01); *F16L 11/20* (2013.01); *F16L 29/002* (2013.01);
(Continued)

(58) Field of Classification Search
CPC ......... F16L 39/005; F16L 33/01; F16L 11/20; F16L 29/007; F16L 29/002; F16L 11/12
See application file for complete search history.

(56) References Cited

U.S. PATENT DOCUMENTS 4,669,757 A * 6/1987 Bartholomew ..... F16L 37/0985
285/55
5,881,757 A * 3/1999 Kuster ............... G05D 16/0608
137/454.2

(Continued)

FOREIGN PATENT DOCUMENTS

DE  20 2014 000 070 U1  2/2015
EP      3 258 152 A1    12/2017
EP      3 258 154 A1    12/2017

OTHER PUBLICATIONS

International Search Report of corresponding International Application No. PCT/US2022/051631, dated Feb. 21, 2023, 16 pages.

*Primary Examiner* — David Colon-Morales
(74) *Attorney, Agent, or Firm* — Tucker Ellis LLP

(57) ABSTRACT

Provided is a connection assembly for connecting to inner and outer hoses. The connection assembly includes a first connector assembly, a second connector assembly, a first hose connector assembly coupled to the connector assembly and configured to be coupled to the inner and outer hoses, the first hose connector assembly including a first tube connector configured to be coupled to the inner hose and a first collar configured to be coupled to the outer hose, and a second hose connector assembly coupled to the second connector assembly and configured to be coupled to the inner and outer hoses, the second hose connector assembly including a second tube connector configured to be coupled to the inner hose and a second collar configured to be coupled to the outer hose, wherein the second tube connector (Continued)

has a cross-sectional area that is smaller than a cross-sectional area of the first tube connector.

20 Claims, 19 Drawing Sheets

(51) Int. Cl.
*F16L 29/00* (2006.01)
*F16L 39/00* (2006.01)
*F16L 29/04* (2006.01)
*F16L 33/22* (2006.01)
*F16L 51/00* (2006.01)

(52) U.S. Cl.
CPC ............ *F16L 39/005* (2013.01); *F16L 29/007* (2013.01); *F16L 29/04* (2013.01); *F16L 33/223* (2013.01); *F16L 51/00* (2013.01)

(56) References Cited

U.S. PATENT DOCUMENTS

| | | | | |
|---|---|---|---|---|
| 7,140,595 | B2 * | 11/2006 | Youngberg | G05D 16/0608 251/359 |
| 7,654,282 | B2 * | 2/2010 | Lo | G05D 16/103 137/508 |
| 8,714,186 | B2 * | 5/2014 | Ungerecht | G05D 16/0655 137/505.28 |
| 8,757,213 | B2 * | 6/2014 | Berardi | F16L 55/1018 138/119 |
| 9,310,000 | B2 * | 4/2016 | Liang | F16L 33/003 |
| 9,367,070 | B2 * | 6/2016 | Greenwood | G05D 16/0636 |
| 9,459,631 | B2 * | 10/2016 | Lawyer | G05D 16/0608 |
| 9,709,194 | B1 * | 7/2017 | Pan | F16L 33/2071 |
| 9,765,909 | B2 * | 9/2017 | Ashcroft | B32B 7/12 |
| 10,228,082 | B2 * | 3/2019 | De Nora | F16L 33/224 |
| 10,386,867 | B2 * | 8/2019 | Drechsel | F16K 1/126 |
| 10,393,291 | B2 * | 8/2019 | Caplan | F16L 33/01 |
| 10,458,574 | B2 * | 10/2019 | Blanchette | F16L 33/207 |
| 10,480,691 | B2 * | 11/2019 | Pan | F16L 11/10 |
| 10,550,965 | B2 * | 2/2020 | Lord | F16L 11/12 |
| 10,563,796 | B2 * | 2/2020 | De Nora | B29C 48/18 |
| 10,724,663 | B2 * | 7/2020 | Rose | F16L 21/06 |
| 11,118,707 | B2 * | 9/2021 | Zhang | F16L 11/045 |
| 11,732,826 | B2 * | 8/2023 | Mishan | F16L 33/223 138/109 |
| 11,927,284 | B2 * | 3/2024 | Breeden, III | F16L 33/225 |
| 2016/0215919 | A1 * | 7/2016 | Huang | F16L 33/224 |
| 2016/0319964 | A1 * | 11/2016 | Sung | F16L 11/02 |
| 2019/0226615 | A1 * | 7/2019 | Wu | F16L 33/01 |
| 2019/0242502 | A1 | 8/2019 | Pan | |
| 2019/0285212 | A1 * | 9/2019 | Righi | F16L 31/00 |
| 2020/0158269 | A1 * | 5/2020 | Perlmutter | F16L 33/01 |
| 2022/0082193 | A1 * | 3/2022 | Zheng | F16L 11/12 |

* cited by examiner

EXPANDABLE HOSE

FIELD OF INVENTION

The present invention relates generally to a hose, and more particularly to a hose for use with a spigot. The hose includes a first end that can be threaded onto a spigot, and a second end that can receive a nozzle, sprinkler, or other suitable device.

BACKGROUND

Hoses can be provided for attachment to a spigot at a home, for example, for watering lawns and gardens. The hoses can be rolled up on a hose reel when not in use, or may be expandable hoses that retract when the water is turned off.

SUMMARY OF INVENTION

According to an aspect, a connection assembly for connecting to inner and outer hoses is provided. The connection assembly includes a first connector assembly including a fluid connector configured to be coupled to a spigot, a second connector assembly configured to be coupled to an attachment, a first hose connector assembly coupled to the connector assembly and configured to be coupled to the inner and outer hoses, the first hose connector assembly including a first tube connector configured to be coupled to the inner hose and a first collar configured to be coupled to the outer hose, and a second hose connector assembly coupled to the second connector assembly and configured to be coupled to the inner and outer hoses, the second hose connector assembly including a second tube connector configured to be coupled to the inner hose and a second collar configured to be coupled to the outer hose, wherein the second tube connector has a cross-sectional area that is smaller than a cross-sectional area of the first tube connector.

According to another aspect, a hose is provided that includes a first connector assembly configured to be coupled to a spigot, a second connector assembly configured to be coupled to an attachment, and a hose assembly coupled to the first and second connector assemblies, the hose assembly including an inner hose member having first and second ends, an outer hose member having first and second ends, a first hose connector assembly coupled to the first ends of the inner hose member and outer hose member and the first connector assembly, and a second hose connector assembly coupled to the second ends of the inner hose member and outer hose member and the second connector assembly, the first hose connector assembly including a first tube connector coupled to the inner hose member and a first collar coupled to the outer hose member, and the second hose connector assembly including a second tube connector coupled to the inner hose member and a second collar coupled to the outer hose member, wherein the second tube connector has a cross-sectional area that is about thirty percent smaller than a cross-sectional area of the first tube connector.

According to still another aspect, a connection assembly for connecting to inner and outer hoses is provided. The connection assembly includes a first connector assembly including a fluid connector configured to be coupled to a spigot, a second connector assembly configured to be coupled to an attachment, a first hose connector assembly coupled to the connector assembly, the first hose connector assembly including a first tube connector configured to be coupled to the inner hose and a first collar configured to be coupled to the outer hose, and a second hose connector assembly coupled to the second connector assembly, the second hose connector assembly including a second tube connector configured to be coupled to the inner hose and a second collar configured to be coupled to the outer hose, wherein the second tube connector has a flow passage that is smaller than a flow passage of the first tube connector.

The foregoing and other features of the application are described below with reference to the drawings.

DETAILED DESCRIPTION

Figure 1:
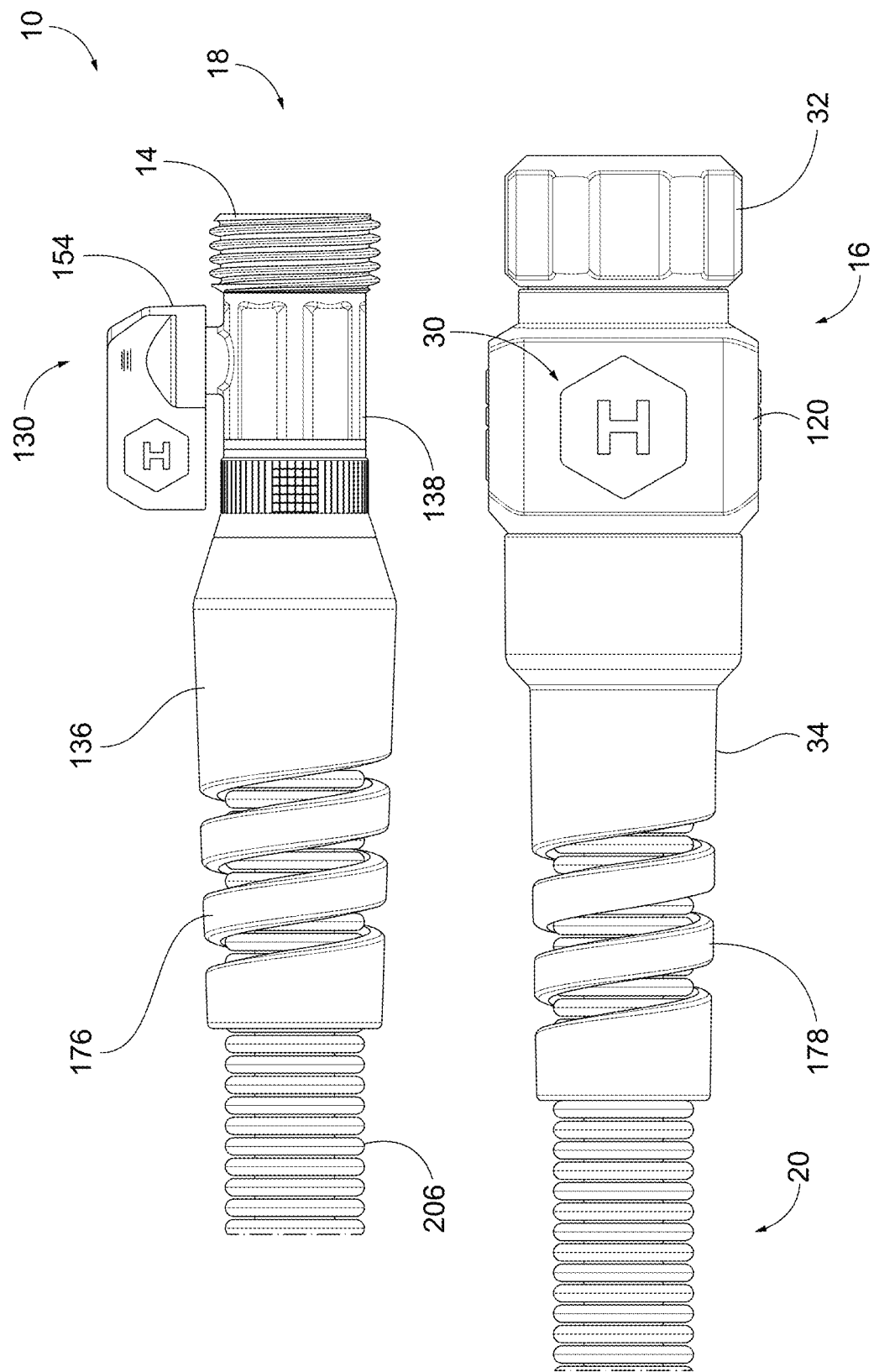
FIG. 1 is a side view of an exemplary expandable hose.

Turning initially to FIG. 1, an expandable hose is shown generally at reference numeral 10. The expandable hose 10 can be automatically expanded upon the introduction of fluid pressure and automatically contracted when there is no fluid pressure. The expandable hose has first and second ends 12 and 14, a first connector assembly 16 at the first end 12, a second connector assembly 18 at the second end 14, and a hose assembly 20 connected to the first and second connector assemblies 16 and 18. The first connector assembly 16 is configured to couple to a spigot and the second connector assembly 18 is configured to couple to a nozzle, spray wand, sprinkler, water toy, or other suitable water delivery device, or coupled to a vehicle or other powered component.

Figure 2:
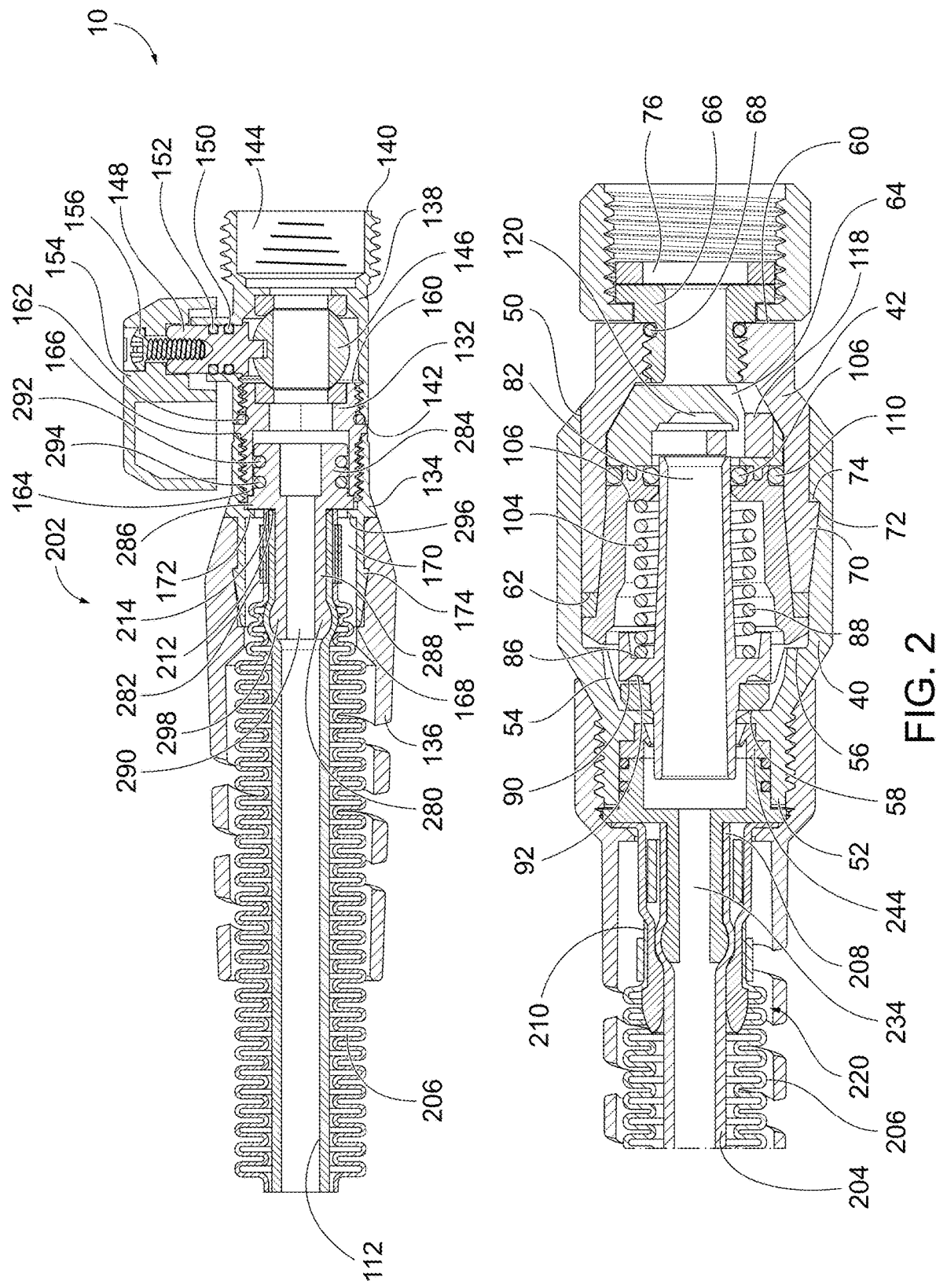
FIG. 2 is a cross-sectional view of the expandable hose.
Figure 3:
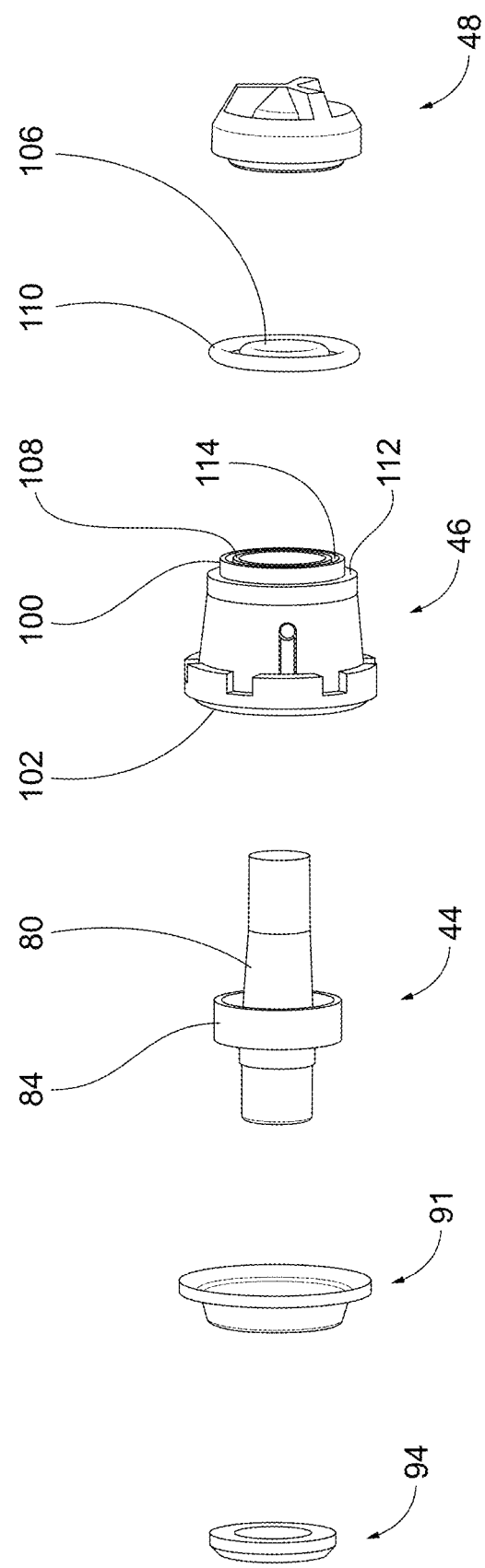
FIG. 3 is an exploded view of components of a regulator assembly of the expandable hose.

Referring additionally to FIGS. 2 and 3, the first connector assembly 16 will be described in detail. The first connector assembly 16 includes a regulator assembly 30, a spigot connector 32 attached to one end of the regulator assembly 30, and a strain relief sleeve 34 that along with the hose assembly 20 is attached to the other end of the regulator assembly 30.

The regulator assembly 30 is provided to reduce a pressure of fluid flowing through the hose 10. For example, fluid pressure in a spigot may be as high as one hundred forty pounds per square inch (PSI), but such high pressure tends to cause traditional expandable hoses to burst and is unnecessary for the operation of lawn and garden accessories like nozzles and sprinklers. The regulator assembly 30 is provided to reduce the pressure of the fluid entering the hose from the spigot to a predetermined pressure, for example between sixty and eighty PSI to prevent the water pressure from causing the hose 10 to burst.

The regulator assembly 30 includes a body formed by a first or outer housing 40 and a second or inner housing 42, a valve stem 44, a valve cup 46, and a valve seat 48. The components may be made of a suitable material, such as a suitable polymer, such as acrylonitrile butadiene styrene. The first housing 40 has a first end 50, a second end 52 with an attachment mechanism for attaching to the strain relief sleeve 34, for example by a threaded connection as shown, press fit, adhesive, etc., and a passage 54 extending therebetween. First and second inner ledges 56 and 58 are defined in the passage 54.

The second housing 42 has a first end 60 that connects to the spigot connector 32, a second end 62 received in the passage 54, and a passage 64 extending therebetween. The first end 60 connects to the spigot connector 32 in a suitable manner, such as by an intervening member 66 received in the spigot connector 32 and threadably connected to the first end 60 as shown, by a press fit, etc. The intervening member 66 may be sealed to the second housing 42 in a suitable manner, such as by a suitable seal, such as O-ring 68, and a gasket 76 may be provided for sealing to a spigot. The second end 62 connects to the first housing 40 in a suitable manner. For example, the second housing 42 can include a plurality of wedges 70 circumferentially spaced on an outer surface thereof near the first end 60, where each wedge 70 includes a ledge 72. The wedges 70 are received in corresponding circumferentially spaced niches 74 in the passage 54 and the ledges 72 engage the niches 74 to secure the second housing 42 to the first housing 40.

Turning now to FIG. 3, the valve stem 44 has a body 80 with a passage 82 extending therethrough and a flanged portion 84 projecting outward from the body 80. A first side 86 of the flanged portion 84 serves as a spring seat for a spring 88, and a second side 90 contacts a flexible diaphragm 92. The flexible diaphragm 92 is disposed between the second side 90 and a gasket 94 and between the first inner ledge 56 and the valve cup 46. The gasket 94 is coupled to or otherwise moves with the valve stem 44 and seals against the second inner ledge 58 when the valve stem 44 is in an open position. The valve stem 44 is biased in the open position by the spring 88 and movable against the biasing force by fluid pressure to adjust flow through regulator assembly 30.

Turning now to the valve cup 46, the valve cup 46 is disposed in the passage 54 and has a first end 100, a second end 102 held between the first inner ledge 56 and the second end 62 of the second housing 42, and a passage 104 extending therebetween. An inner ledge 106 is defined in the passage 104 and serves as a spring seat for the other end of the spring 88, and the body 80 of the valve stem 44 extends through the passage 104 and out of the second end 102 of the valve cup 46. The valve stem 44 is sealed to the first end 100 of the value cup 46 by a suitable seal, such as O-ring 106 disposed in a seal groove 108, and the valve cup 46 is sealed to an inner surface of the second housing 42 by a suitable seal, such as O-ring 110 disposed in a seal groove 112.

Between the seal grooves 108 and 112 is an annular channel 114 for receiving a corresponding annular projection 116 of the valve seat 48. When the projection 116 is in the annular channel 114, the valve seat 48 seals against the O-rings 106 and 110 and is held between the valve cup 46 and an inner surface of the second housing 42 in the passage 64. The valve seat 48 includes one or more passages 118 therethrough for fluid to flow, and a seat 120 on an underside thereof that is contacted by the valve stem 44 in a closed position to block flow through the regulator assembly 30, for example when a high back pressure urges the stem 44 in the closed position. When the pressure reduces, the force of the spring 88 will move the valve stem 44 away from the seat 120. The stem 44 is movable between the open and closed positions to adjust the flow based on the pressure of the fluid passing through the regulator.

With continued reference to FIG. 2, the second connector assembly 18 will be described in detail. The second connector assembly 18 includes a ball valve assembly 130, a spacer 132 connected to the ball valve assembly 130, a sleeve connector 134 connected to the spacer 132, and a strain relief sleeve 136 connected to sleeve connector 134. The ball valve assembly 130 includes a body 138 with a first end 140 for connecting to a nozzle, sprinkler, etc., for example by a threaded connection, a second end 142 for connecting to the spacer 132, and a passage 144 extending between the first and second ends 140 and 142. Disposed in the passage 144 is a ball valve 146 movable from a closed position blocking flow through the passage 144 to an open position allowing flow through the passage 144, and a number of positions therebetween. The ball valve 146 is rotated by a stem 148 sealed to the body 138 by suitable seals, such as O-ring 150 and 152, and the stem 148 is rotated by a lever 154 coupled to the stem 148 in a suitable manner, such as by a fastener 156.

The spacer 132 has a first end 160 connected to the second end 142 of the body 138 in a suitable manner, such as by a threaded connection, and sealed thereto by a suitable seal, such as O-ring 162, and a second end 164 connected to a first end 166 of the sleeve connector 134 in a suitable manner, such as by a threaded connection. It will be appreciated that in an embodiment, the sleeve connector 134 may be provided with threads that mate with the threads at the second end 142 of the body 138 and the spacer 132 may be eliminated.

The sleeve connector 134 has the first end 166, a second end 168 connected to the strain relief sleeve 136, and a passage 170 extending between the first and second ends 166 and 168. A shoulder 172 is defined in the passage 170 for retaining a tube connector of the hose assembly 20 as will be described below. The second end 168 may be connected to the strain relief sleeve 136 in a suitable manner, such as by one or more barbs 174 as shown, by a threaded connection, etc. The strain relief sleeve 136 and the strain relief sleeve 34 may be made of a suitable material, such as nylon, and each include a coiled portion 176, 178 allowing the sleeves to bend with bending of the hose to reduce or eliminate rupturing of the hose, and to expand/retract with movement of the hose.

Figure 4:
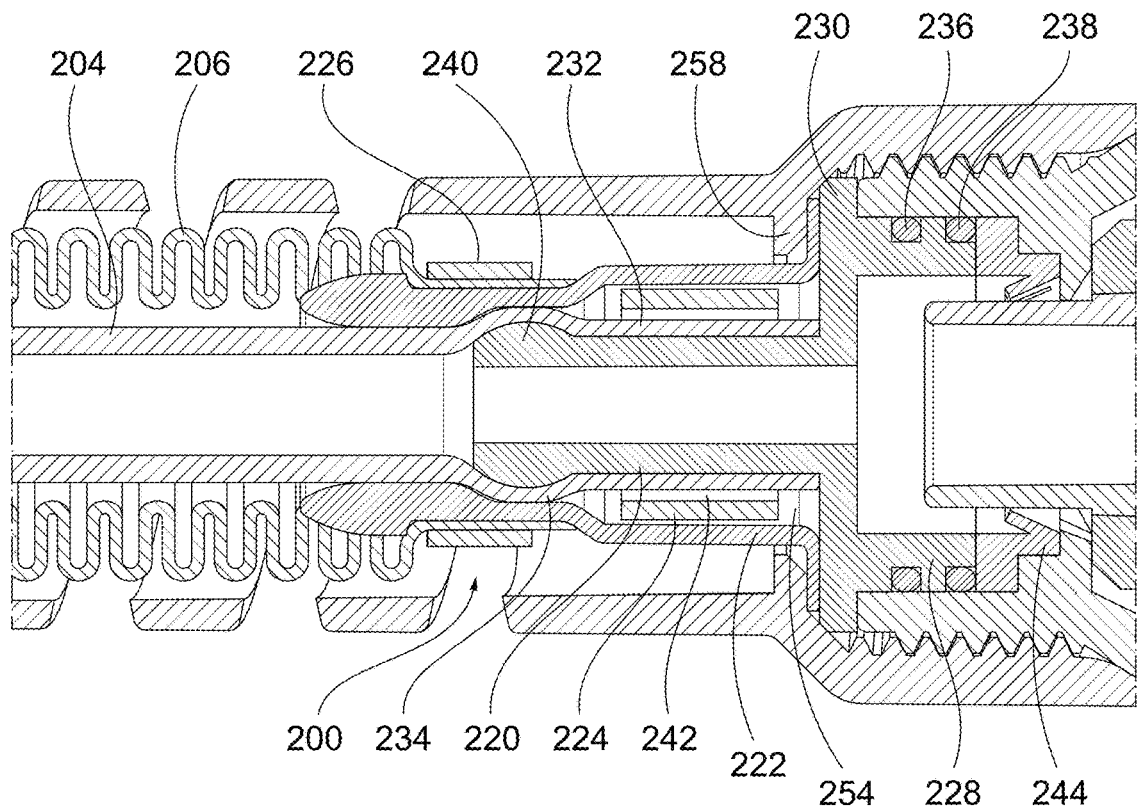
FIG. 4 is a cross-sectional view of a portion of the expandable hose showing an inner tube and outer jacket in a retracted position.
Figure 5:
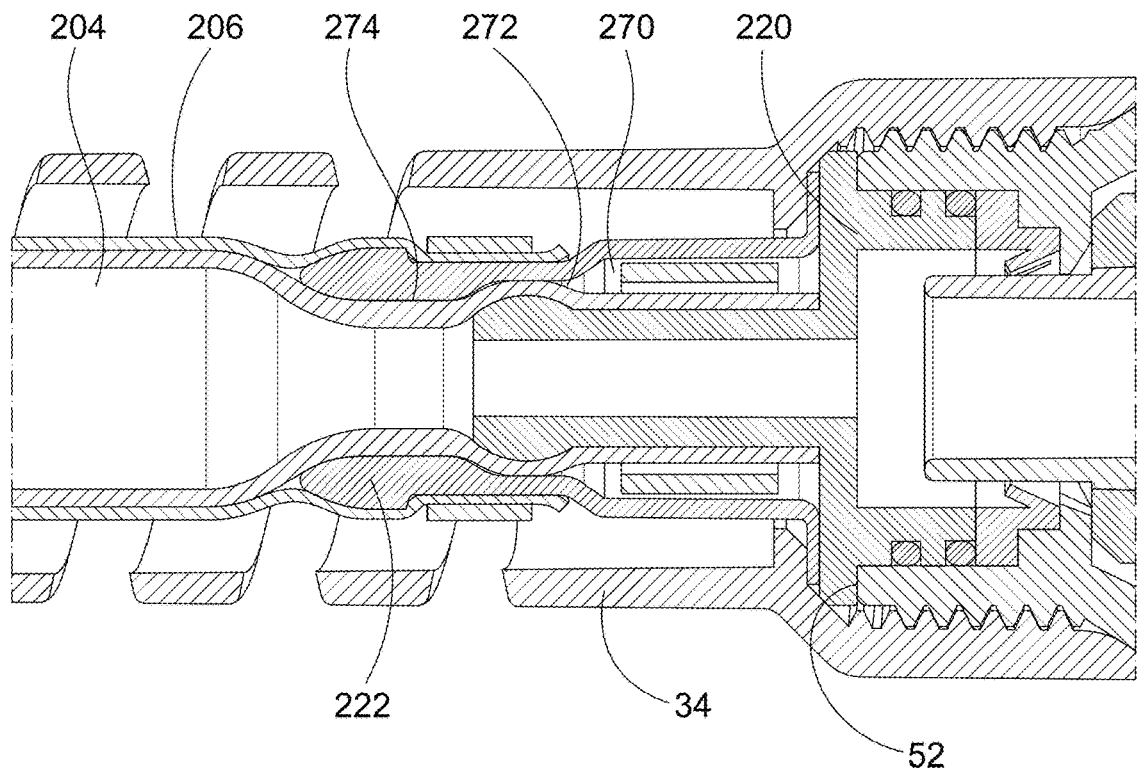
FIG. 5 is a cross-sectional view of a portion of the expandable hose showing the inner tube and outer jacket in an expanded position.

Referring additionally to FIGS. 4 and 5, the hose assembly 20 will be described in detail. The hose assembly 20 includes a first hose connector assembly 200, a second hose connector assembly 202, an inner hose member 204, and an outer hose member 206 surrounding the inner tube 204. The inner hose member 204 or inner tube and the outer hose member 206 or outer jacket are connected to the first and second hose connector assemblies 200 and 202 at respective first ends 208 and 210 and respective second ends 212 and 214. As will be described in more detail below, because the most strain is applied to the inner tube 204 at the first end, the inner tube 204 and outer jacket 206 are not connected to one another at their first ends 208 and 210 to reduce wear on the inner tube 204. Although not shown, it will be appreciated that the inner tube and outer jacket may be coupled to the second hose connector assembly 202 in a similar manner as the first hose connector assembly 200.

The inner tube 204 is made of a suitable flexible fluid carrying material such as, for example, an elastic material, such as rubber, to permit the inner tube 204 to expand when a pressurized fluid is introduced into the inner tube 204. It will be appreciated that other suitable materials having elastic properties can also be used. As the fluid flow increases, the inner tube 204 expands both laterally and longitudinally as shown in FIG. 5. The expansion of the inner tube 204, both laterally and longitudinally, results in a decrease in the wall thickness of the inner tube 204 and an increase in the diameter of the inner tube 204 thus increasing the volume of fluid that can flow through the inner tube 204. The outer jacket 206 may be made of suitable fibers woven to allow the jacket to expand and contract, such as nylon or polyester fibers, or may be made of another suitable material. The outer jacket 206 may have a greater longitudinal length than the inner tube 204, and may include peaks and valleys when there is no fluid flow through the hose.

Turning now to the first hose connector assembly 200 in detail, the assembly includes a tube connector 220, a collar 222, a first retainer 224, and a second retainer 226. The tube connector 220 may be made of a suitable material, such as nylon, and includes a base 228 having a flanged portion 230, an elongate portion 232 extending from the base 228, and a passage 234 extending through the base 228 and elongate portion 232. The base 228 is disposed within the second end 52 of the outer housing 40 and sealed thereto by one or more suitable seals, such as O-rings 236 and 238, and the flanged portion 230 is held between second end 52 of the outer housing 40 and an inner surface of the strain relief sleeve 34 to couple the tube connector 220 to the first connector assembly 16. The elongate portion 232 receives the first end 208 of the inner tube 204 and includes a bulbous or radiused end 240 over which the first end of the inner tube is received providing a rounded area to prevent rupture/tearing of the inner tube 204 when bent. The first end 208 of the inner tube 204 is held on the elongate portion 232 by the first retainer 224, which may be a suitable clamp or the like. A sleeve 242, which may be a gasket, tape, mesh, or the like, may be provided between the inner tube 204 and the retainer 224 to provide protection to the inner tube 204 at the connection point. A spacer 244 may be provided between the tube connector 220 and the ledge of the outer housing 40 or the tube connector 220 may be sized larger.

Figure 6:
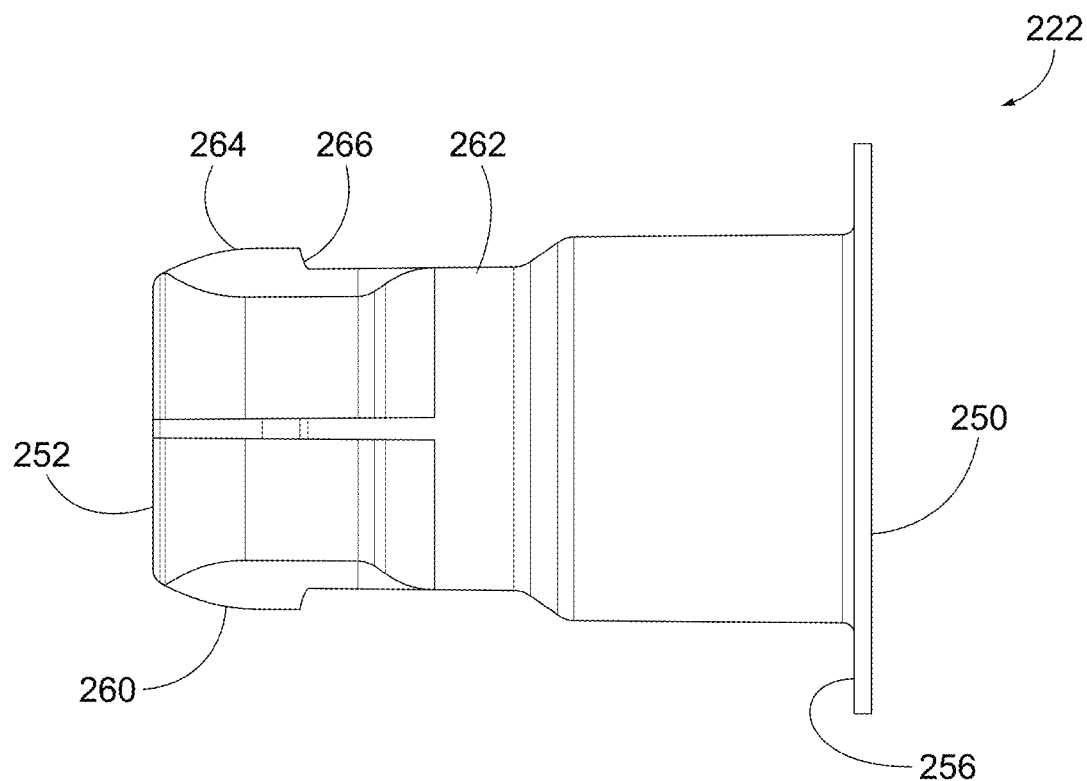
FIG. 6 is a side view of an exemplary collar.
Figure 7:
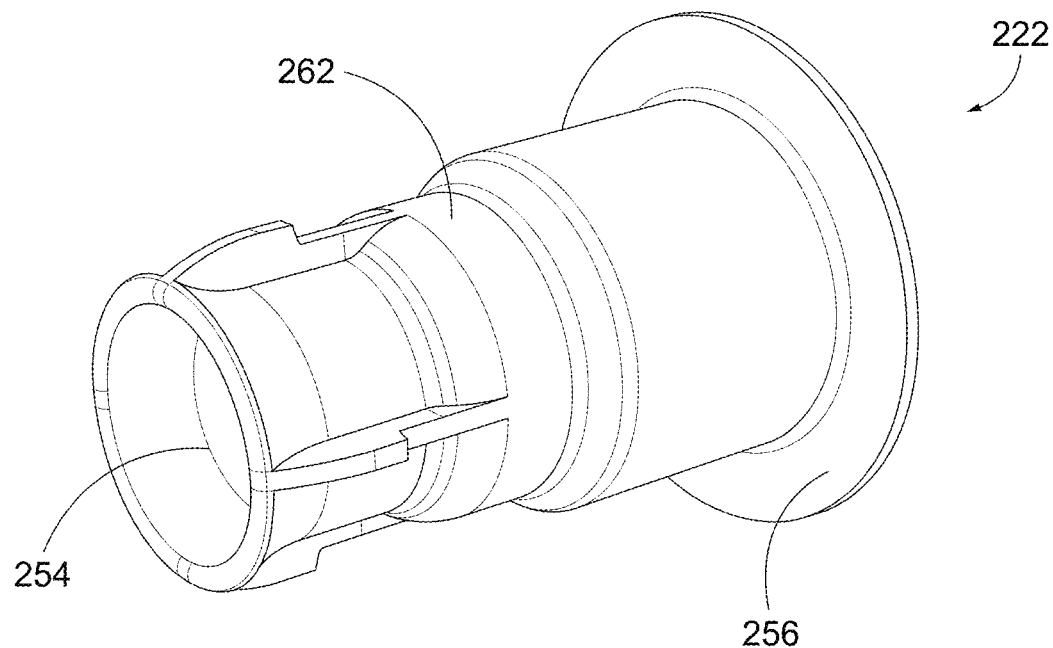
FIG. 7 is a perspective view of the collar.
Figure 8:
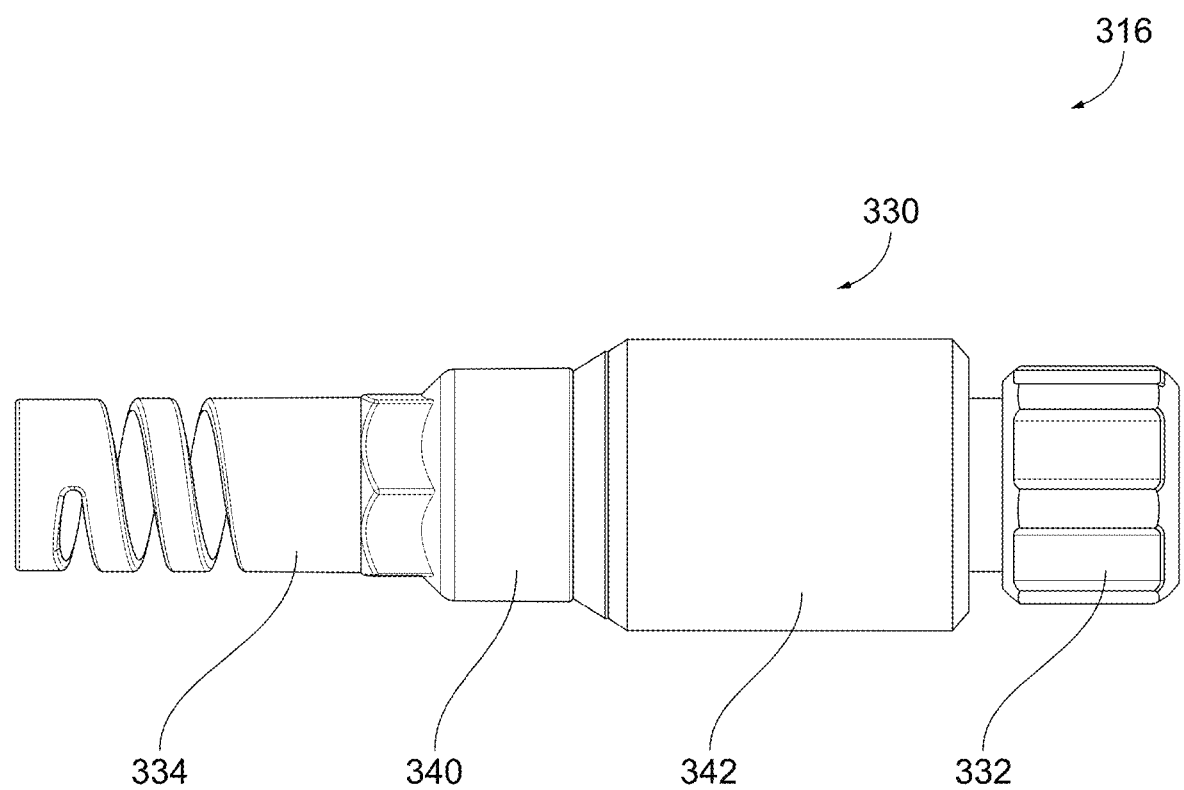
FIG. 8 is a side view of a connector assembly of another exemplary expandable hose.
Figure 9:
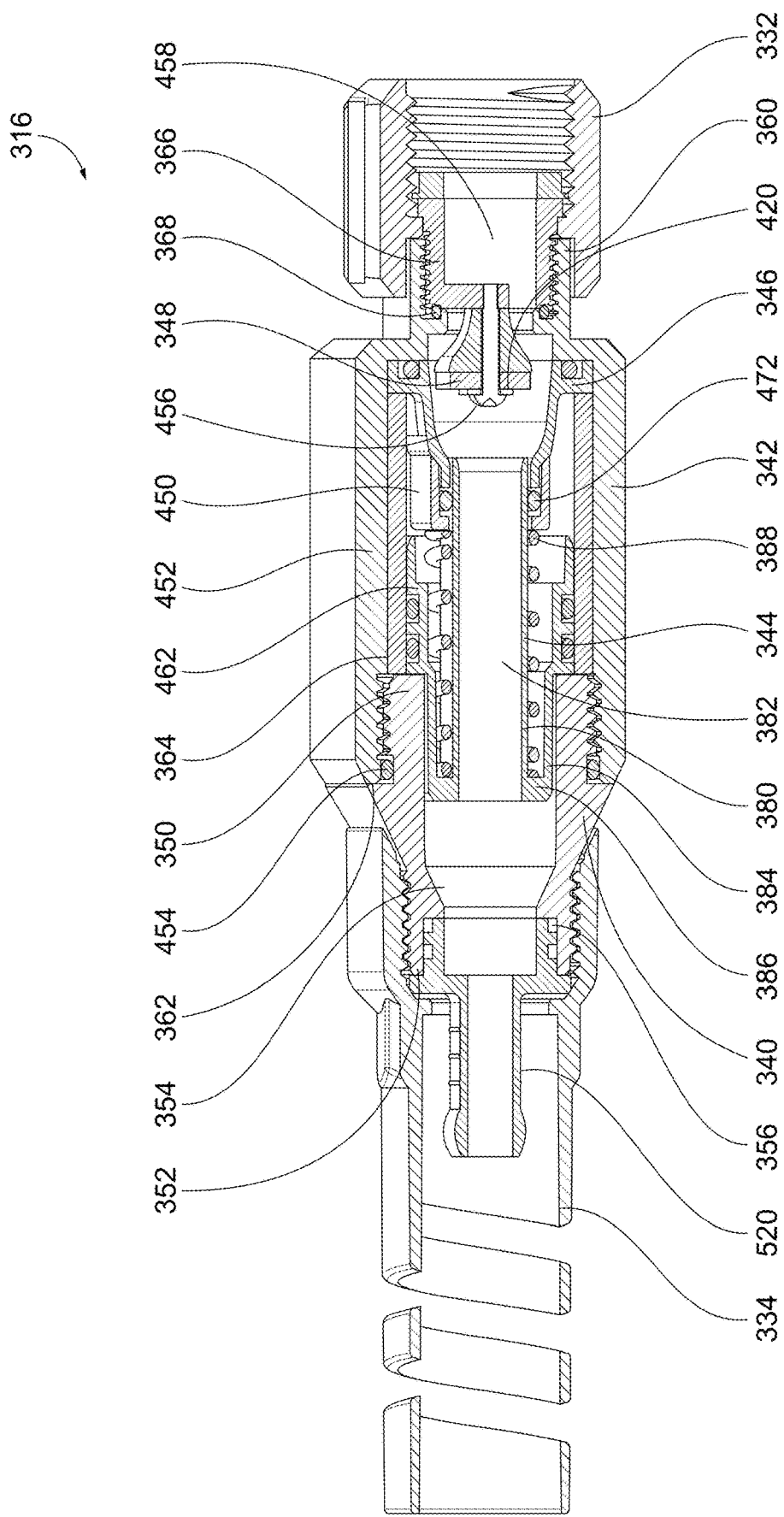
FIG. 9 is a cross-sectional view of the connector assembly in an open position.
Figure 10:
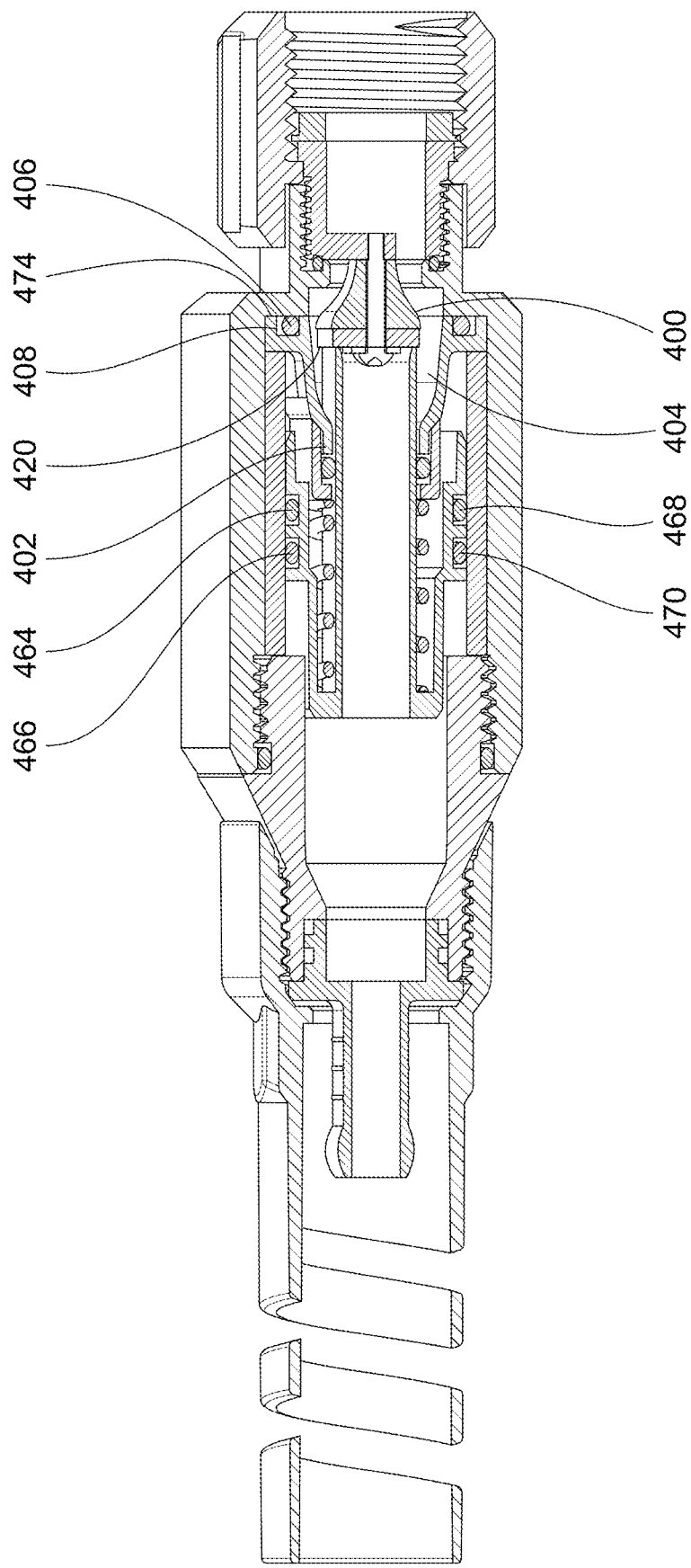
FIG. 10 is a cross-sectional view of the connector assembly in a closed position.

Turning additionally to FIGS. 6 and 7, the collar 222 surrounds the first end 208 of the inner tube 204 and the elongate portion 232 and extends past the second end of the tube connector 220 to provide a connection area for the outer jacket 206 to prevent the outer jacket 206 from wearing against the inner tube 204. The collar 222 has first and second ends 250 and 252, a passage 254 extending therebetween, a flanged portion 256 at the first end 250 held between the flanged portion 230 of the tube connector 220 and an inner ledge 258 of the strain relief sleeve 34, a plurality of circumferentially spaced fins 260 at the second end 252, and a groove 262 for receiving the first end 210 of the jacket 206 and the second retainer 226 to couple the jacket 206 to the collar 222. The plurality of circumferentially spaced fins 260 have a curved portion 264 curving upward from the second end 252 to the first end 250, and an edge 266 at a back of the curved portion 264 that bites into the outer jacket 206.

The passage 254 includes a first portion 270 having a first diameter for accommodating the inner tube 204, first retainer 224, and elongate portion 232, a second portion 272 having a second diameter less than the first diameter for accommodating the inner tube 204 and radiused end 240, and a third portion 274 having a third diameter less than the second diameter for accommodating the inner tube 204. The collar 222 curves outward at the second end 252 such that the third portion 274 is also curved outward providing a smooth area for the inner tube 204 to contact when expanded to prevent the collar 222 from biting into the inner tube 204.

Turning now to the second hose connector assembly 202, the assembly includes a tube connector 280 and a first retainer 282. The tube connector 280 may be made of a suitable material, such as nylon, and includes a base 284 having a flanged portion 286, an elongate portion 288 extending from the base 284, and a passage 290 extending through the base 284 and elongate portion 288. The base 284 is disposed within the spacer 132 and sealed thereto by one or more suitable seals, such as O-rings 292 and 294, and the flanged portion 286 is held between the second end 164 of the spacer 132 and an inner ledge 296 of the sleeve connector 134 to couple the tube connector 280 to the second connector assembly 18. The elongate portion 288 receives the second end 212 of the inner tube 204 and includes a bulbous or radiused end 298 over which the second end of the inner tube is received to prevent rupture/tearing of the inner tube 204 when bent. The second end 212 of the inner tube 204 is held on the elongate portion 288 by the first retainer 282, which may be a suitable clamp or the like. A sleeve (not shown), which may be a gasket, tape, mesh, or the like, may be provided between the inner tube 204 and the retainer 282 to provide protection to the inner tube 204 at the connection point. The tube connector 280 may be sized proportionally to the tube connector 220 for retraction. For example, the tube connector 280 may have a cross-sectional area that is smaller than a cross-sectional area of the tube connector 220 to prevent the hose from retracting under flow. In an embodiment, the cross-sectional area of the tube connector 280 is about thirty percent less than the cross-sectional area of the tube connector 220.

Referring again to FIGS. 4 and 5, the operation of the hose 10 will be described. The spigot connector 32 can be attached to a spigot by threading the connector onto the spigot, while a nozzle or the like in an off position is attached to the second connector assembly 18 and/or the ball valve assembly 130 is placed in a closed position. A user can then turn on the spigot and fluid, such as water flows under pressure into the regulator assembly 30, where the pressure of the water can be regulated. The water flows through the one or more passages 118 in the valve seat 48 into the passage of the valve stem 44. The water then flows through the passage 234 in the tube connector 220 and into the inner tube 204, causing the inner tube 204 to expand laterally and longitudinally, which causes the outer jacket 206 to expand longitudinally. The user can then open the ball valve assembly 130 allowing water to be delivered from the hose. During use, the valve stem 44 can move against the biasing force of the spring 88 to adjust the flow through the regulator assembly 30, and can seat against the valve seat 48, for example when a high back pressure urges the stem 44 in the closed position.

Turning now to FIGS. 8-11, an exemplary embodiment of the first connector assembly is shown at 316. The first connector assembly 316 is substantially the same as the above-referenced first connector assembly 16, and consequently the same reference numerals but indexed by 300 are used to denote structures corresponding to similar structures in the assemblies. In addition, the foregoing description of the first connector assembly 16 is equally applicable to the first connector assembly 316 except as noted below.

The first connector assembly 316 includes a regulator assembly 330, a spigot connector 332 attached to one end of the regulator assembly 330, and a strain relief sleeve 334 that along with a hose assembly is attached to the other end of the regulator assembly 330.

The regulator assembly 330 includes a first housing 340, a second housing 342, a valve stem 344, a valve cup 346, a valve seat 348, a spring seat 450, and a sleeve 452. The first housing 340 has a first end 350 with an attachment mechanism for attaching to a first end of the second housing 342, for example by a threaded connection as shown, press fit, adhesive, etc., a second end 352 with an attachment mechanism for attaching to the strain relief sleeve 334, for example by a threaded connection as shown, press fit, adhesive, etc., and a passage 354 extending therebetween. An inner ledge 356 is defined in the passage 354 to be abutted by a tube connector 520.

Figure 11:
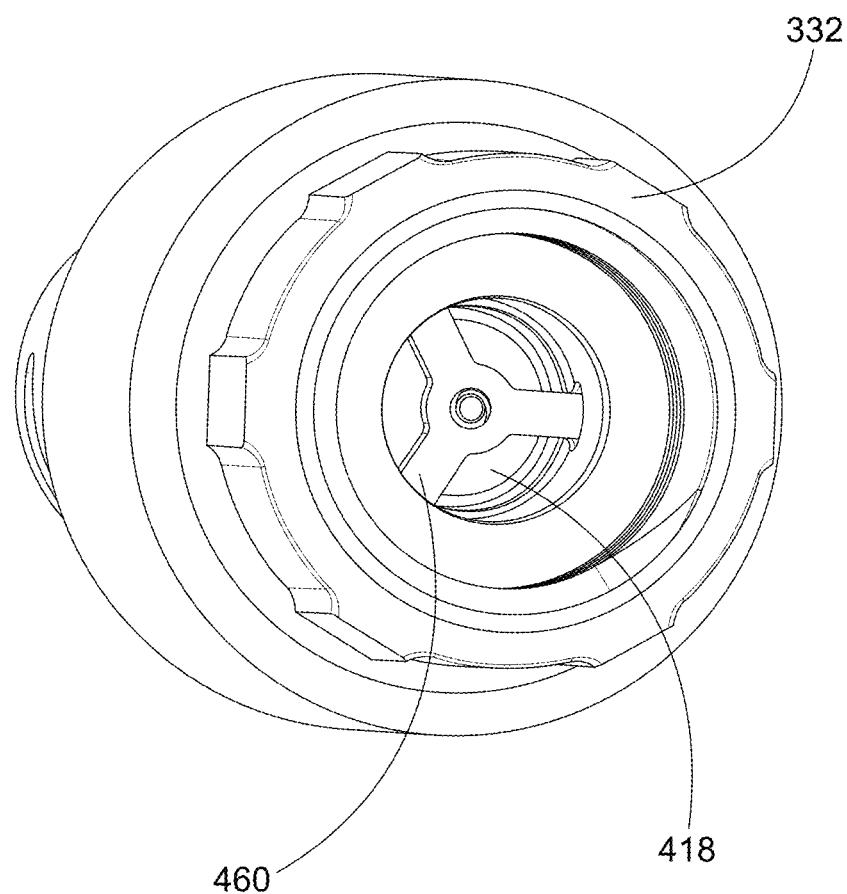
FIG. 11 is a perspective end view of the connection assembly.

The second housing 342 has the first end 360 that connects to the spigot connector 332, a second end 362 that is sealed to the first housing 340 in a suitable manner, such as by a suitable seal, such as O-ring 454, and a passage 364 extending therebetween. The first end 360 connects to the spigot connector 332 in a suitable manner, such as by an intervening member 366 received in the spigot connector 332 and threadably connected to the first end 360 as shown, by a press fit, etc. The intervening member 366 may be sealed to the second housing 342 in a suitable manner, such as by a suitable seal, such as O-ring 368, and may be coupled to the valve seat 348 in a suitable manner, such as by fastener 456. As best shown in FIG. 11, the intervening member 366 has a passage 458 with a plurality of spaced flow dividers 460 forming one or more passages 418 through which the fluid flows from the spigot.

Turning now to the valve stem 344, the valve stem 344 has a body 380 with a passage 382 extending therethrough and a flanged portion 384 projecting outward from the body 380. A first side 386 of the flanged portion 384 serves as a spring seat for a spring 388. The flange portion 384 also includes an annular outwardly extending portion 462 defining a ledge that abuts the second end 352 of the first housing 340 in an open position. The outwardly extending portion 462 includes one or more seal grooves 464 and 466 for receiving a corresponding seal, such as O-rings 468 and 470 respectively, which move with the valve stem 344 to maintain a seal between the valve stem 344 and the sleeve 452.

It will be appreciated that in an embodiment the sleeve 452 may be eliminated and the valve stem 344 seal against the second housing 342. The valve stem 344 is biased in the open position shown in FIG. 9 by the spring 388 and movable against the biasing force by fluid pressure to adjust flow through regulator assembly 330 to the closed position shown in FIG. 10. The spring seat abuts the valve cup 346 and serves as a seat for the other end of the spring 388. The valve stem 344 moves within and is sealed against the spring seat 450 by a suitable seal, such as O-ring 472.

Turning now to the valve cup 346, the valve cup 346 is disposed in the passage 364 and has a first end 400 abutting an inner ledge 474 of the second housing 342, a second end 402 surrounding the body 380 of the valve stem 344, and a passage 404 extending therebetween. The valve stem 344 is sealed to the inner ledge 474 by a suitable seal, such as O-ring 406 disposed in a seal groove 408. A portion of the valve seat 348 is disposed in the passage 404, and the valve seat 348 curves inward toward the intervening member 366.

The valve seat 348 includes a seat 420 on an underside thereof that is contacted by the valve stem 344 in a closed position to block flow through the regulator assembly 330, for example when a high back pressure urges the stem 344 in the closed position. When the pressure reduces, the force of the spring 388 will move the valve stem 344 away from the seat 420. The stem 344 is movable between the open and closed positions to adjust the flow based on the pressure of the fluid passing through the regulator.

Figure 12:
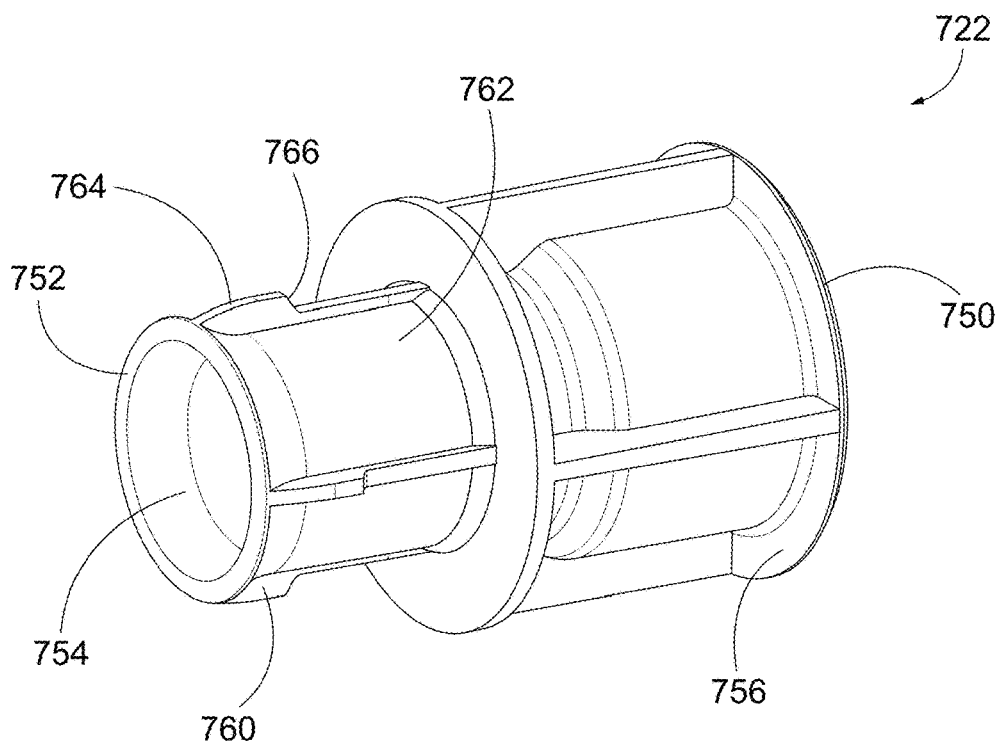
FIG. 12 is a perspective view of another exemplary collar.
Figure 13:
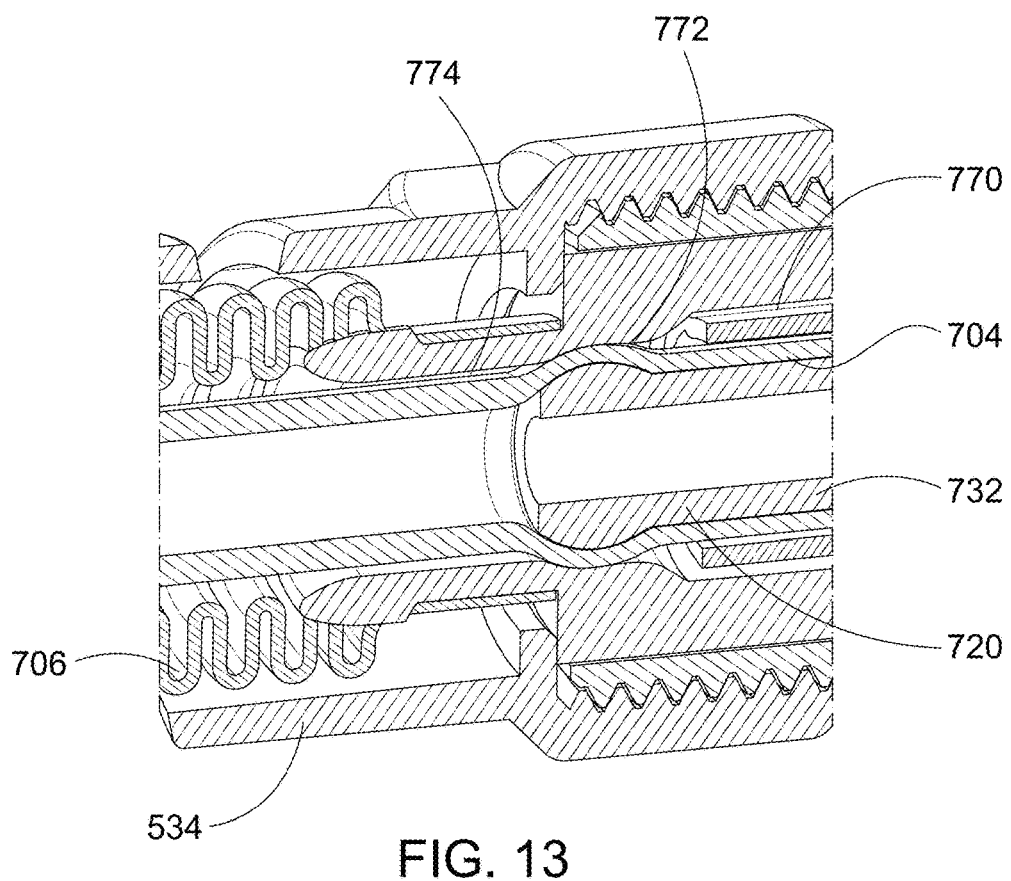
FIG. 13 is a cross-sectional view of a portion of the expandable hose showing the collar of FIG. 12.

Turning now to FIGS. 12 and 13, an exemplary embodiment of the collar is shown at 722. The collar 722 is substantially the same as the above-referenced collar 222, and consequently the same reference numerals but indexed by 500 are used to denote structures corresponding to similar structures in the collars. In addition, the foregoing description of the collar 222 is equally applicable to the collar 722 except as noted below.

The collar 722 surrounds a first end of an inner tube 704 and an elongate portion 732 of a tube connector 720 to provide a connection area for an outer jacket 706 to prevent the outer jacket 706 from wearing against the inner tube 704. The collar 722 has first and second ends 750 and 752, a passage 754 extending therebetween, a flanged portion 756 held between a flanged portion of the tube connector 720 and an inner ledge 758 of a strain relief sleeve 534, a plurality of circumferentially spaced fins 760 at the second end 752, and a groove 762 for receiving a first end 710 of the jacket 706 and a second retainer (not shown) to couple the jacket 706 to the collar 722. The plurality of circumferentially spaced fins 760 have a curved portion 764 curving upward from the second end 752 to the first end 750, and an edge 766 at a back of the curved portion 764 that bites into the outer jacket 706.

The passage 754 includes a first portion 770 having a first diameter for accommodating the inner tube 704, a first retainer 724, and the elongate portion 732, a second portion 772 having a second diameter less than the first diameter for accommodating the inner tube 704 and the radiused end 740 of the elongate portion 732, and a third portion 774 having a third diameter less than the second diameter for accommodating the inner tube 704. The collar 722 curves outward at the second end 752 such that the third portion 774 is also curved outward providing a smooth area for the inner tube 704 to contact when expanded to prevent the collar 722 from biting into the inner tube 704.

Figure 14:
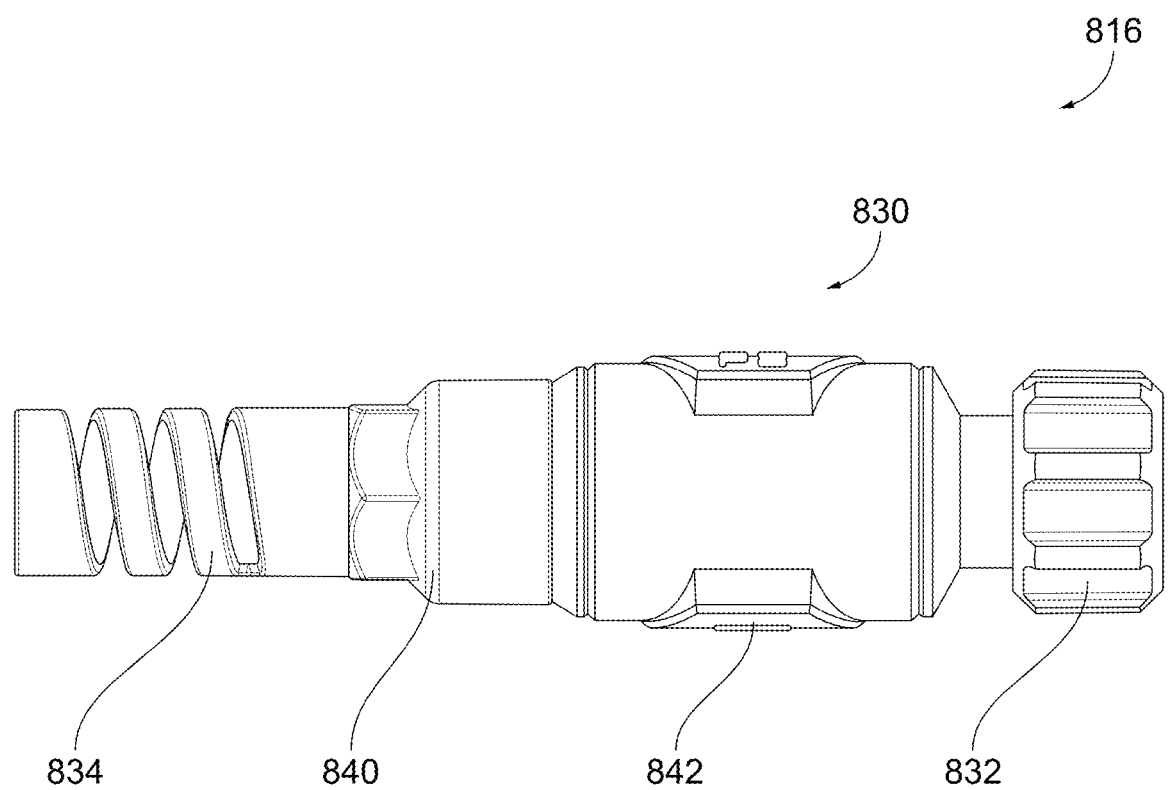
FIG. 14 is a side view of a connector assembly of still another exemplary expandable hose.
Figure 15:
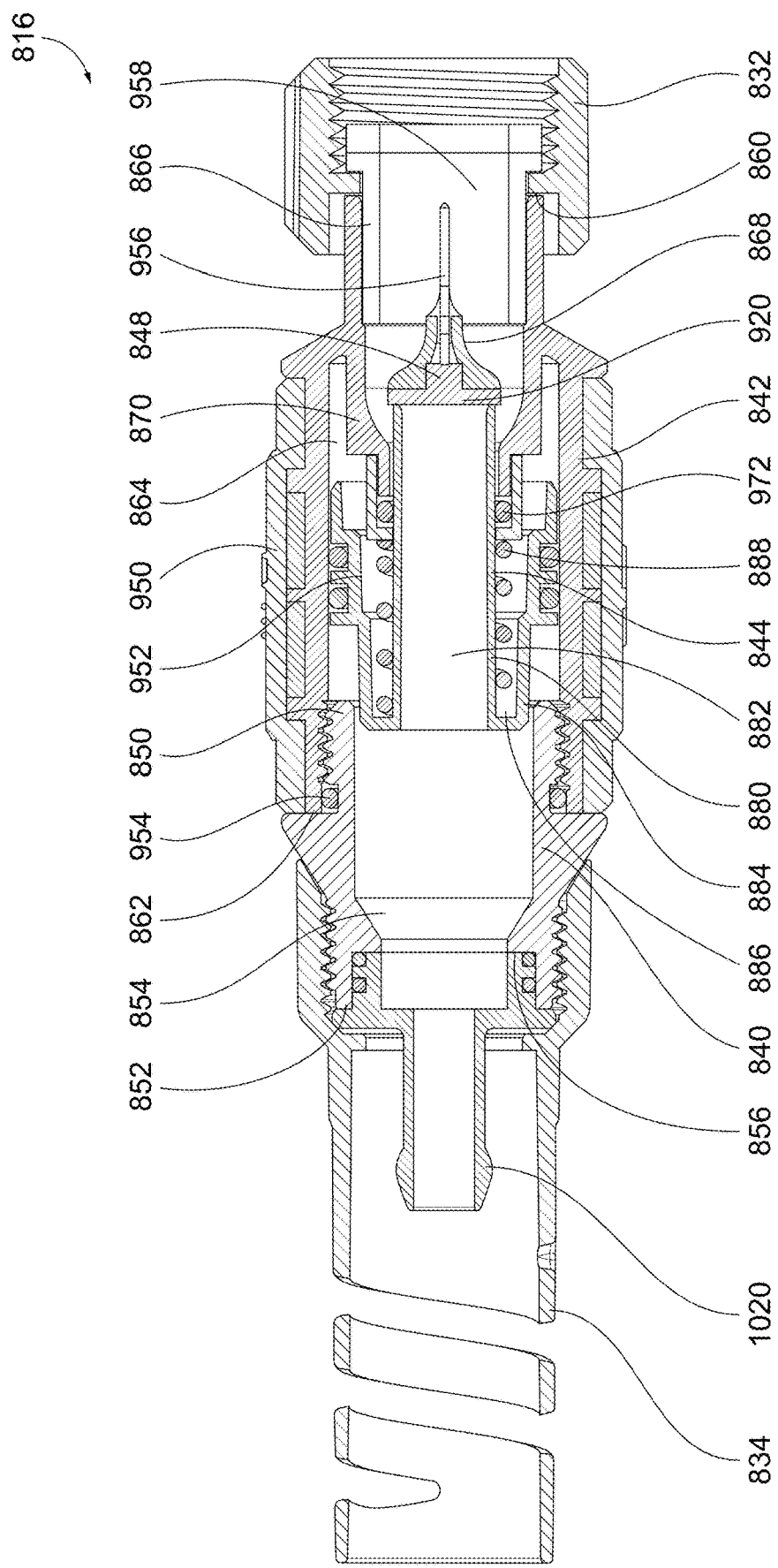
FIG. 15 is a cross-sectional view of the connector assembly in a closed position.
Figure 16:
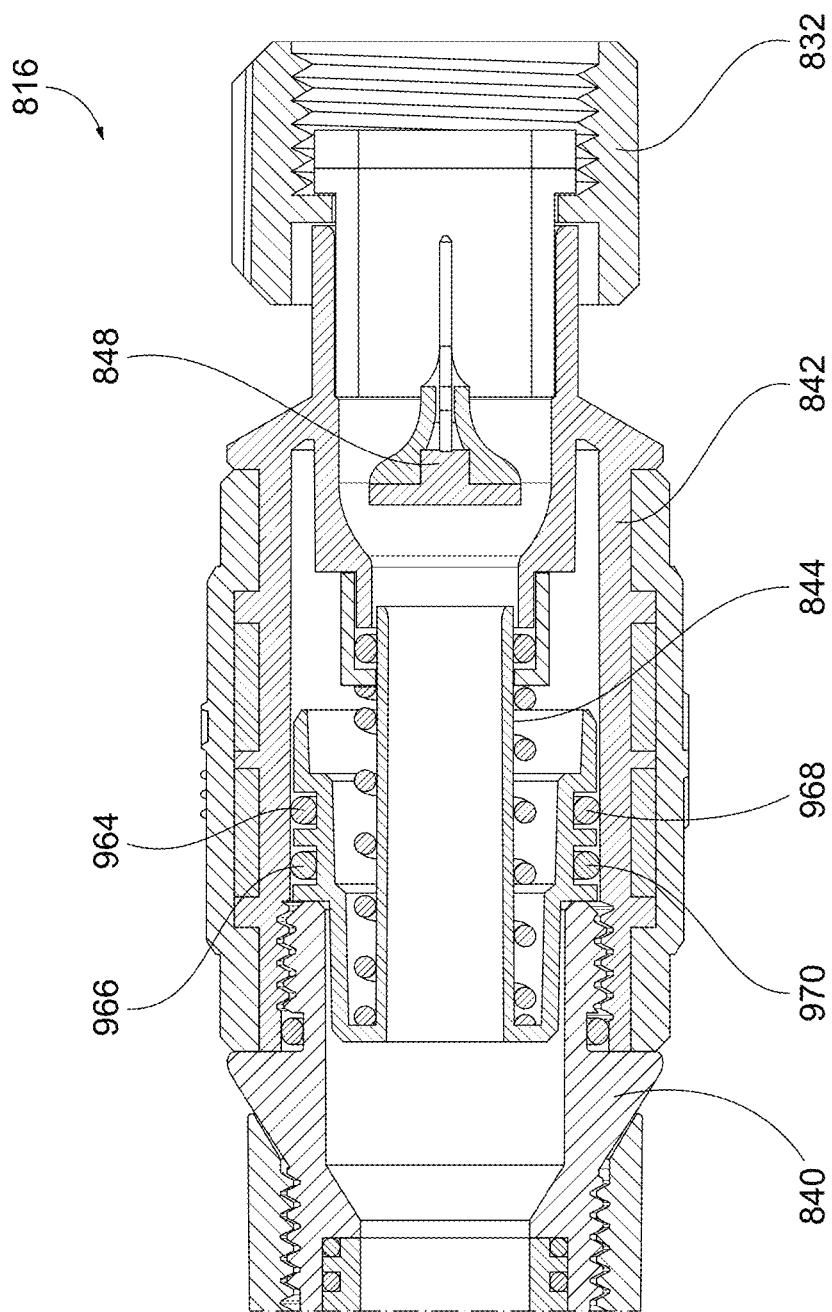
FIG. 16 is a cross-sectional view of the connector assembly in an open position.

Turning now to FIGS. 14-16, an exemplary embodiment of the first connector assembly is shown at 816. The first connector assembly 816 is substantially the same as the above-referenced first connector assembly 316, and consequently the same reference numerals but indexed by 500 are used to denote structures corresponding to similar structures in the assemblies. In addition, the foregoing description of the first connector assembly 316 is equally applicable to the first connector assembly 816 except as noted below.

The first connector assembly 816 includes a regulator assembly 830, a spigot connector 832 attached to one end of the regulator assembly 830, and a strain relief sleeve 834 that along with a hose assembly is attached to the other end of the regulator assembly 830.

The regulator assembly 830 includes a first housing 840, a second housing 842, a valve stem 844, a valve seat 848, and a spring seat 950. The first housing 840 has a first end 850 with an attachment mechanism for attaching to a first end of the second housing 842, for example by a threaded connection as shown, press fit, adhesive, etc., a second end 852 with an attachment mechanism for attaching to the strain relief sleeve 834, for example by a threaded connection as shown, press fit, adhesive, etc., and a passage 854 extending therebetween. An inner ledge 856 is defined in the passage 854 to be abutted by a tube connector 1020.

The second housing 842 has the first end 860 that connects to the spigot connector 832, a second end 862 that is sealed to the first housing 840 in a suitable manner, such as by a suitable seal, such as O-ring 954, and a passage 864 extending therebetween. The second housing can be at least partially surrounded by an overmold 952 or the like. The first end 860 connects to the spigot connector 832 in a suitable manner, such as by an intervening member 866 received in the spigot connector 832 and attached to the first end 860 by a suitable weld, adhesive, threaded connection, press fit, etc. The intervening member 866 may be coupled to the valve seat 848 in a suitable manner, such as by a tail 956 of the valve seat 848 received in a corresponding opening in a base 868 of the intervening member 866 and that includes a portion that seats against a top of the base 868. The intervening member 866 has a passage 958 with a plurality of spaced flow dividers forming one or more passages through which the fluid flows from the spigot. The second housing 842 also includes a portion 870 that extends in the passage 864 toward the second end 862 to surrounding a body 880 of the valve stem 844. The portion 870 is attached to the spring seat 950 in a suitable manner, such as by welding, adhesive, etc.

Turning now to the valve stem 844, the valve stem 844 has the body 880 with a passage 882 extending therethrough and a flanged portion 884 projecting outward from the body 880. A first side 886 of the flanged portion 884 serves as a spring seat for a spring 888. The flange portion 884 also includes an annular outwardly extending portion 962 defining a ledge that abuts the second end 852 of the first housing 840 in an open position. The outwardly extending portion 962 includes one or more seal grooves 964 and 966 for receiving a corresponding seal, such as O-rings 968 and 970 respectively, which move with the valve stem 844 to maintain a seal between the valve stem 844 and the second housing 842. The valve stem 844 is biased in the open position shown in FIG. 16 by the spring 888 and movable against the biasing force by fluid pressure to adjust flow through regulator assembly 830 to the closed position shown in FIG. 15. The spring seat 950 serves as a seat for the other end of the spring 388. The valve stem 844 moves within and is sealed against the spring seat 950 by a suitable seal, such as O-ring 972.

The valve seat 848 includes a seat 920 on an underside thereof that is contacted by the valve stem 844 in a closed position to block flow through the regulator assembly 830, for example when a high back pressure urges the stem 844 in the closed position. When the pressure reduces, the force of the spring 888 will move the valve stem 844 away from the seat 920. The stem 844 is movable between the open and closed positions to adjust the flow based on the pressure of the fluid passing through the regulator.

Figure 17:
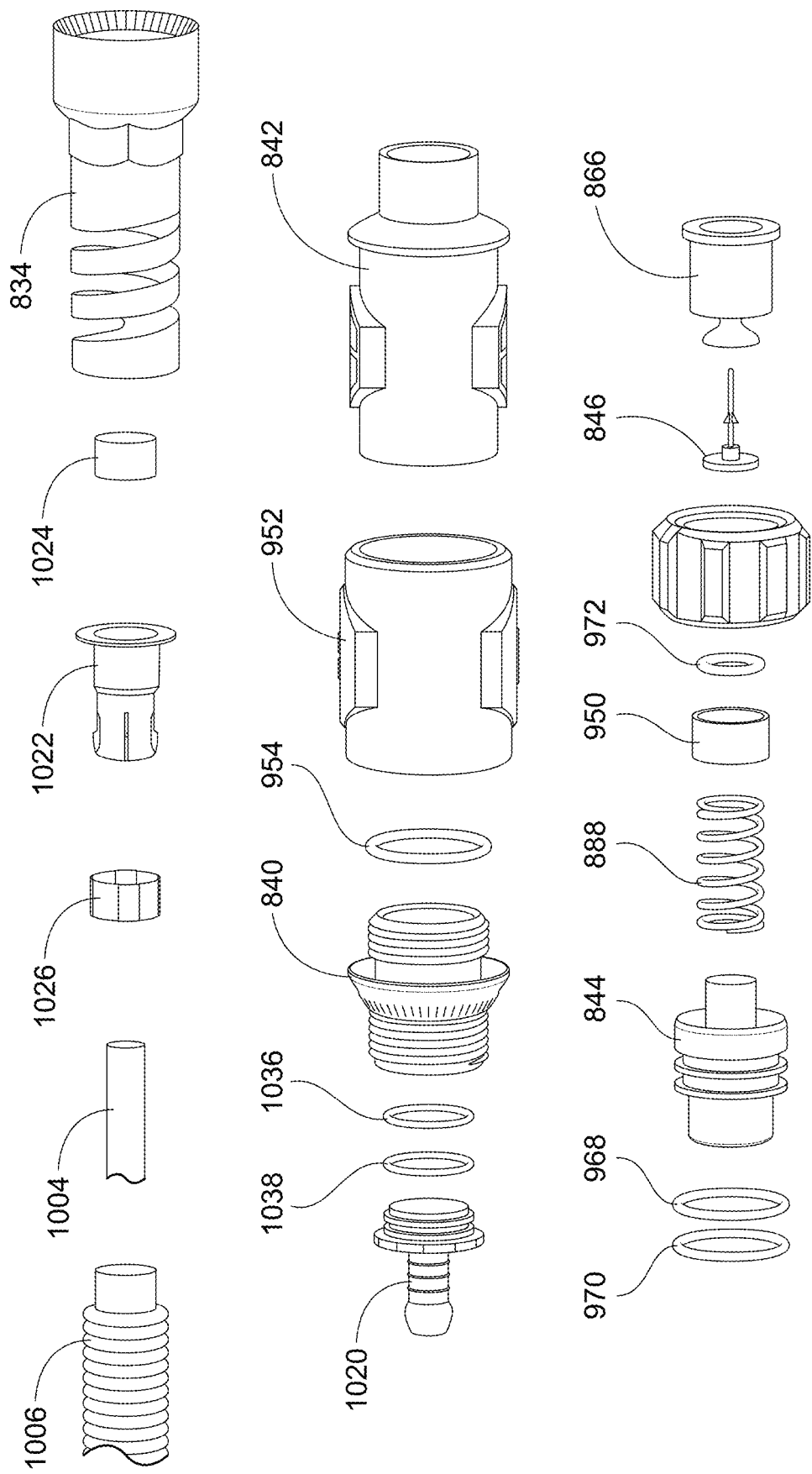
FIG. 17 is an exploded view of an exemplary hose.

Turning additionally to FIG. 17, an exploded view of the first connector assembly 816 is shown along with a first hose connector assembly, an inner hose member 1004, and an outer hose member 1006, which are substantially the same as the above described components. The first hose connector assembly 1000 includes a tube connector 1020, a collar 1022, a first retainer 1024, a second retainer 1026, and seals for sealing the tube connector 1020 to the first housing 840.

Figure 18:
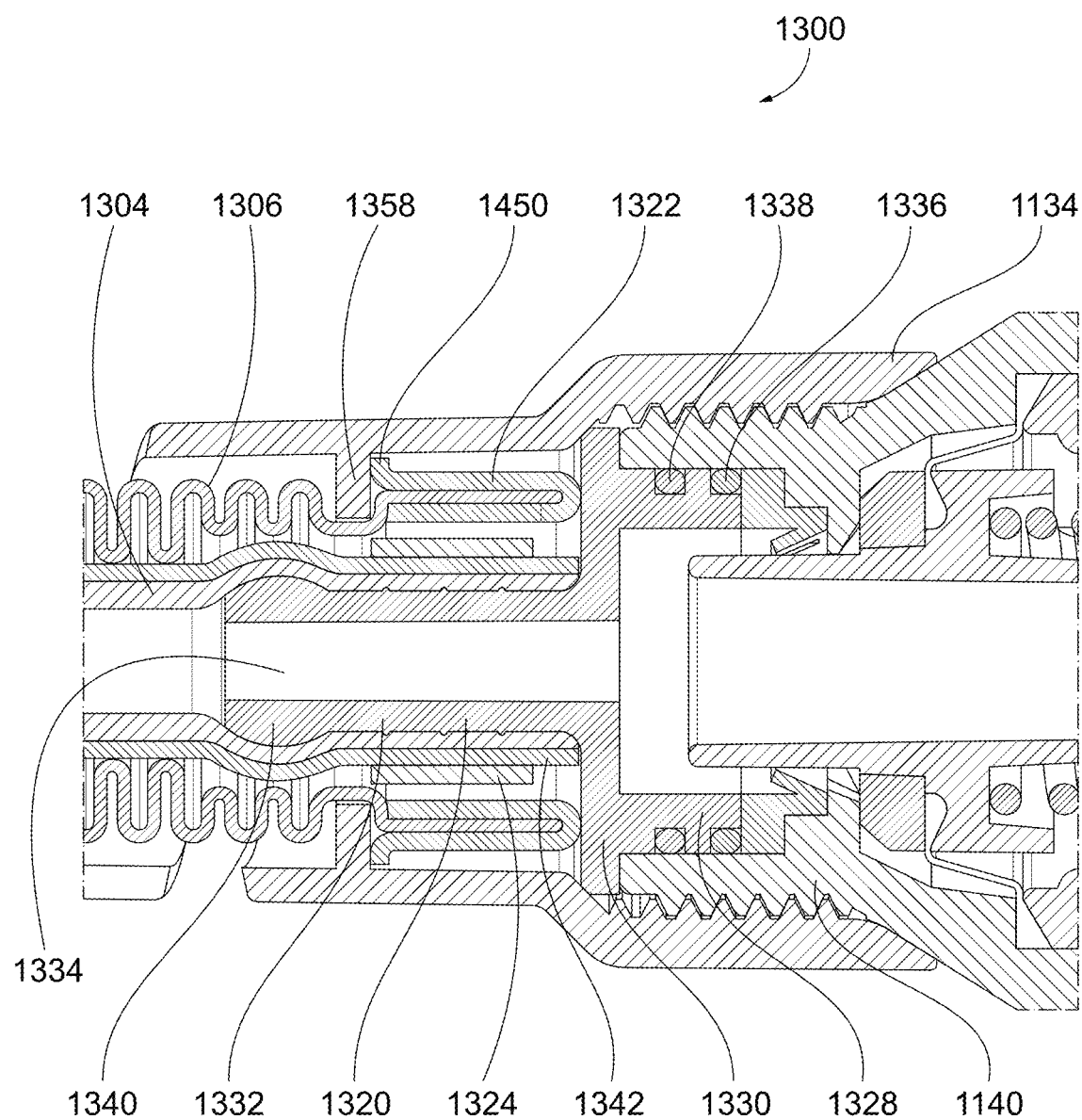
FIG. 18 is a cross-sectional view of a portion of another expandable hose.
Figure 19:
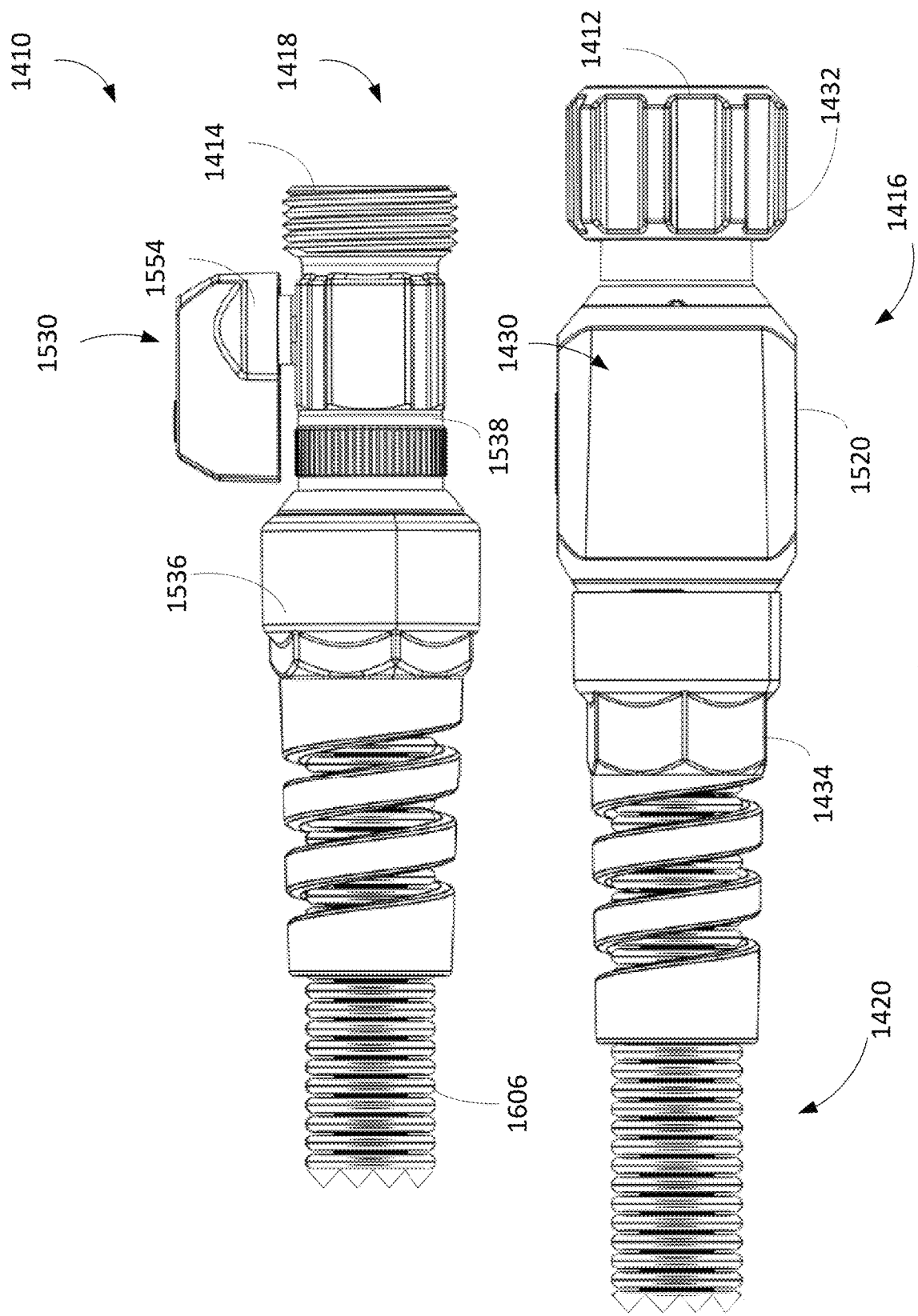
FIG. 19 is a side view of another exemplary hose assembly.
Figure 20:
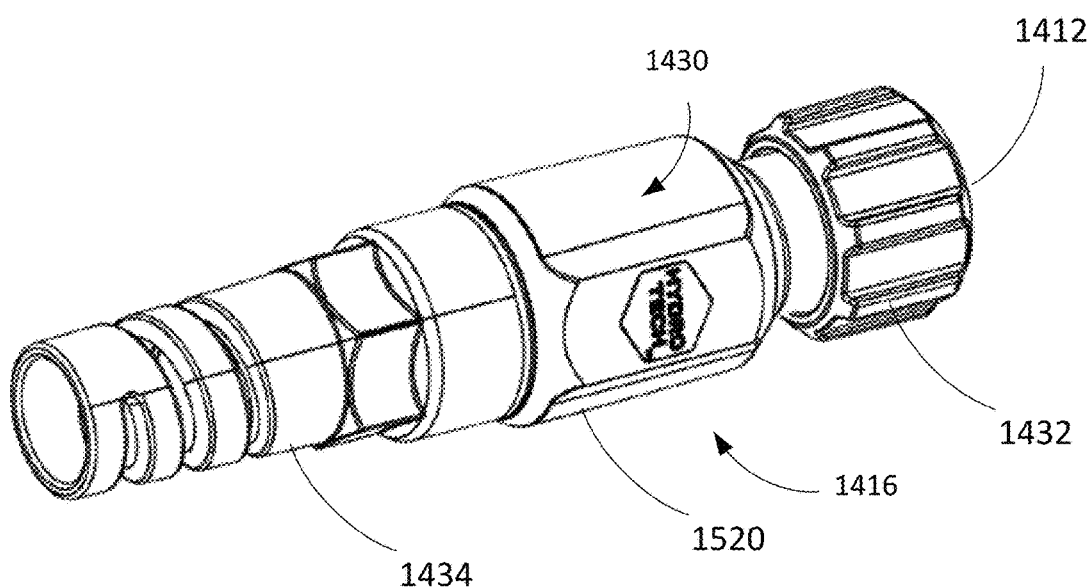
FIG. 20 is a perspective view of an exemplary first connection assembly and first hose connector assembly of the hose assembly.

Turning now to FIG. 18, an exemplary embodiment of a hose connector assembly is shown at 1300. The hose connector assembly 1300 is substantially the same as the above-referenced hose connector assembly 200, and consequently the same reference numerals but indexed by 1100 are used to denote structures corresponding to similar structures in the assemblies. In addition, the foregoing description of the hose connector assembly 200 is equally applicable to the hose connector assembly 1300 except as noted below.

The assembly includes a tube connector 1320, a collar 1322, and a retainer 1324. The tube connector 1320 includes a base 1328 having a flanged portion 1330, an elongate portion 1332 extending from the base 1328, and a passage 1334 extending through the base 1328 and elongate portion 1332. The base 1328 is disposed within an end of an outer housing 1140 and sealed thereto by one or more suitable seals, such as O-rings 1336 and 1338, and the flanged portion 1330 is held between the of the outer housing 1140 and an inner surface of the strain relief sleeve 1134 to couple the tube connector 1320 to the first connector assembly. The elongate portion 1132 receives a first end of the inner tube 1304 and includes a bulbous or radiused end 1340 over which the first end of the inner tube is received. The first end of the inner tube 1304 is held on the elongate portion 1332 by the retainer 1324, which may be a suitable clamp or the like. A sleeve 1342, which may be a gasket, tape, mesh, or the like, may be provided between the inner tube 1304 and the retainer 1324 to provide protection to the inner tube 1304 at the connection point, and the sleeve may extend a distance around the inner tube 1304 past the end 1340.

The collar 1322, which may be made of a suitable material, such as metal, is clamped around a first end of the outer jacket 1306 and includes a ledge 1450 that abuts an inner ledge 1358 of the strain relief 1134. The collar 1322 is held between the ledge 1358 and the flanged portion 1330 of the tube connector 1320.

It will be appreciated that the hose connector assembly 1320 may be used with any of the above described regulator assemblies, and may be utilized with the second end of the hose.

It will be appreciated that the above gaskets and seals may be made of a suitable material, such as rubber, such as a nitrile rubber.

Turning now to FIGS. 19-23, an expandable hose is shown generally at reference numeral 1410. The expandable hose 1410 is substantially the same as the above-referenced expandable hose 10, and consequently the same reference numerals but indexed by 1400 are used to denote structures corresponding to similar structures in the assemblies. In addition, the foregoing description of the expandable hose 10 is equally applicable to the expandable hose 1410 except as noted below.

The expandable hose has first and second ends 1412 and 1414, a first connector assembly 1416 at the first end 1412, a second connector assembly 1418 at the second end 1414, and a hose assembly connected to the first and second connector assemblies 1416 and 1418.

The first connector assembly 1416 includes a regulator assembly 1430, a spigot connector 1432 attached to one end of the regulator assembly 1430, and a strain relief sleeve 1434 that along with a hose assembly is attached to the other end of the regulator assembly 1430. The regulator assembly 1430 is provided to reduce the pressure of the fluid entering the hose from the spigot to a predetermined pressure, for example between sixty and eighty PSI to prevent the water pressure from causing the hose 10 to burst, and in an embodiment seventy PSI.

The regulator assembly 1430 includes a first housing 1440, a second housing 1442, a valve stem 1444, a valve seat 1448, and a spring seat 1550. The first housing 1440 has a first end 1450 with an attachment mechanism for attaching to a first end of the second housing 1442, for example by a threaded connection as shown, press fit, adhesive, etc., a second end 1452 with an attachment mechanism for attaching to the strain relief sleeve 1434, for example by a threaded connection as shown, press fit, adhesive, etc., and a passage extending therebetween.

The second housing 1442 has the first end 1460 that connects to the spigot connector 1432, a second end 1462 that is sealed to the first housing 1440 in a suitable manner, such as by a suitable seal, such as O-ring 1554, and a passage 1464 extending therebetween. The second housing 1442 can be at least partially surrounded by an overmold 1552 or the like. The first end 1460 connects to the spigot connector 1432 in a suitable manner, such as by an intervening member 1466 received in the spigot connector 1432 and attached to the first end 1460 by a suitable weld, adhesive, threaded connection, press fit, etc. The intervening member 1466 may be coupled to the valve seat 1448 in a suitable manner, such as by a fastener 1556 receiving in a corresponding opening in a base 1468 of the intervening member 1466 and that abuts an inner ledge of the base 1468 and is held there by a snap connection and/or a suitable weld. The intervening member 1466 has a passage with a plurality of spaced flow dividers forming one or more passages through which the fluid flows from the spigot. The second housing 1442 also includes a portion 1470 that extends in the passage 1464 toward the second end 1462 to surrounding a body 1480 of the valve stem 1444. The portion 1470 is attached to the spring seat 1550 in a suitable manner, such as by welding, adhesive, etc.

Turning now to the valve stem 1444, the valve stem 1444 has the body 1480 with a passage 1482 extending therethrough and a flanged portion 1484 projecting outward from the body 1480. A first side 1486 of the flanged portion 1484 serves as a spring seat for a spring 1488. The flange portion 1484 also includes an annular outwardly extending portion defining a ledge that abuts the second end 1452 of the first housing 1440 in an open position. The outwardly extending portion includes one or more seal grooves for receiving a corresponding seal, such as O-rings 1568 and 1570 respectively, which move with the valve stem 1444 to maintain a seal between the valve stem 1444 and the second housing 1442. The valve stem 1444 is biased in the open position by the spring 1488 and movable against the biasing force by fluid pressure to adjust flow through regulator assembly 1430 to the closed position. The spring seat 1550 serves as a seat for the other end of the spring 1488. The valve stem 1444 moves within and is sealed against the spring seat 1550 by a suitable seal, such as O-ring 1572.

The valve seat 1448 includes a seat on an underside thereof that is contacted by the valve stem 1444 in a closed position to block flow through the regulator assembly 1430, for example when a high back pressure urges the stem 1444 in the closed position. When the pressure reduces, the force of the spring 1488 will move the valve stem 1444 away from the seat. The stem 1444 is movable between the open and closed positions to adjust the flow based on the pressure of the fluid passing through the regulator.

Figure 21:
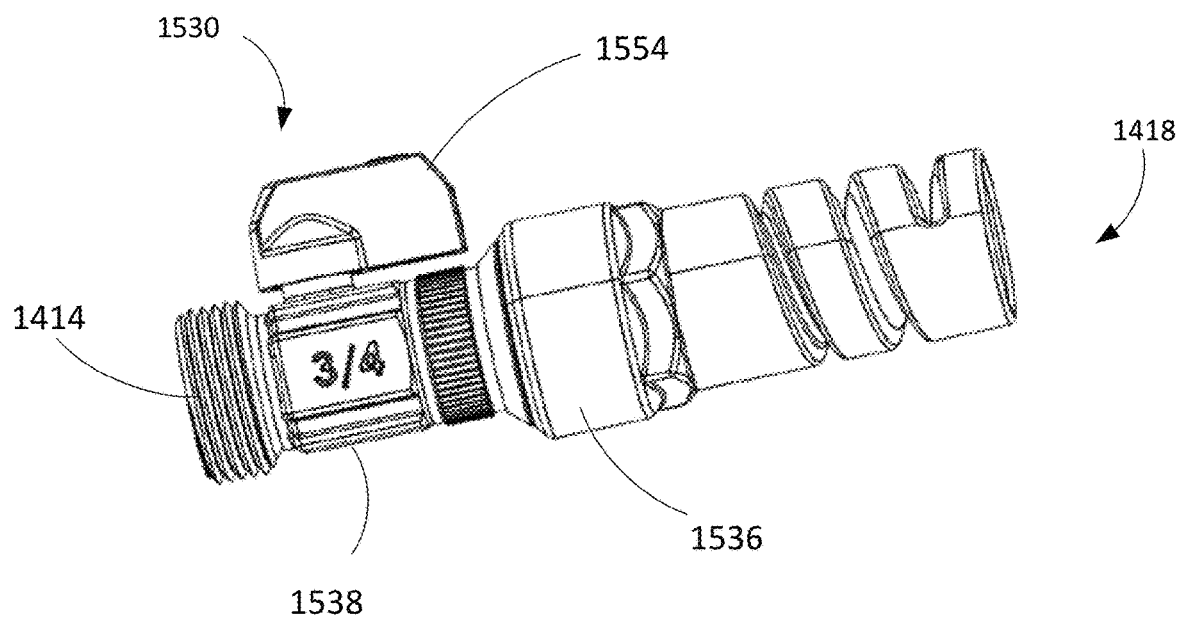
FIG. 21 is a perspective view of an exemplary second connection assembly and second hose connector assembly of the hose assembly.
Figure 22:
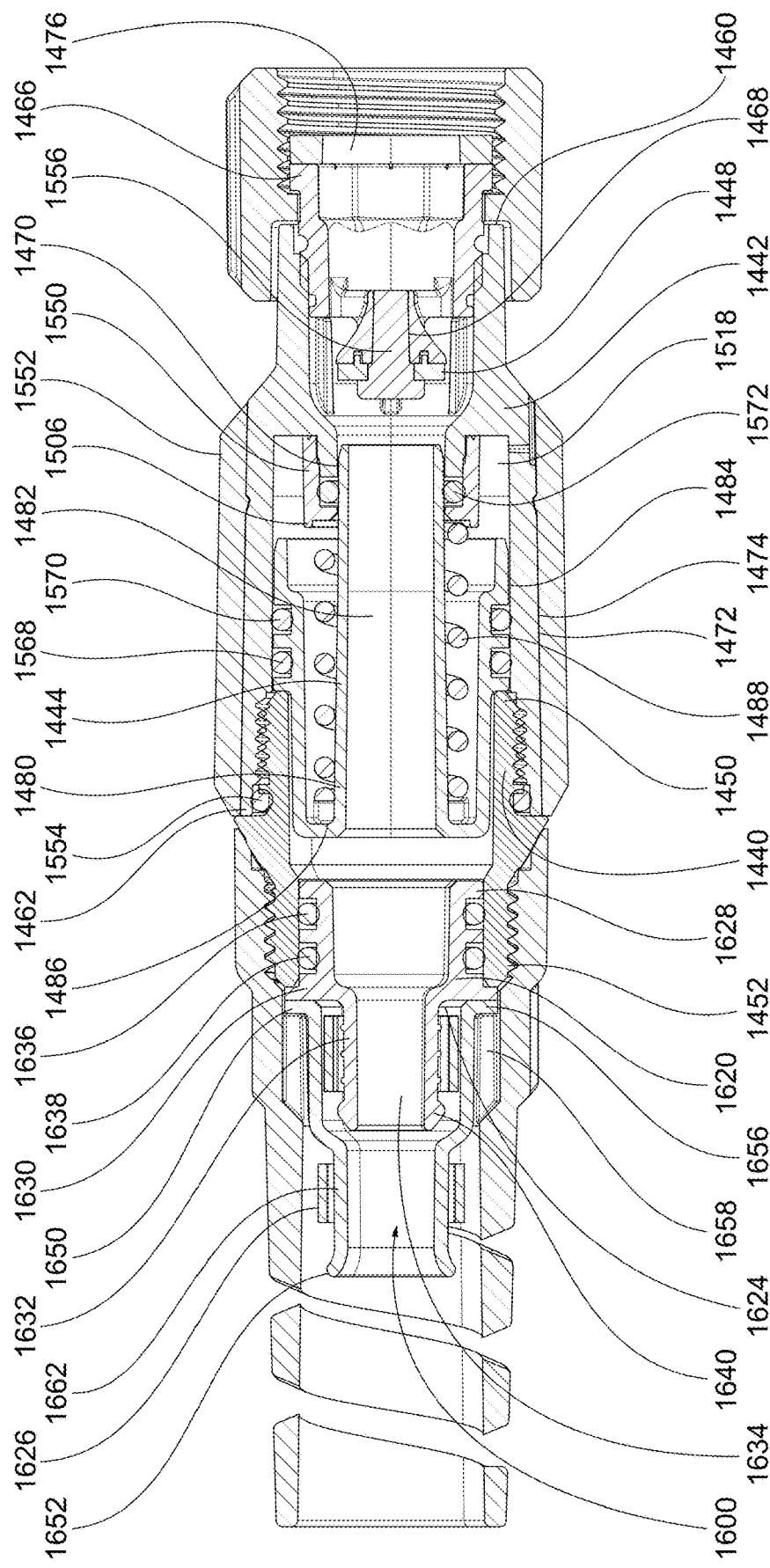
FIG. 22 is a cross-sectional view of the assembly of FIG. 20.
Figure 23:
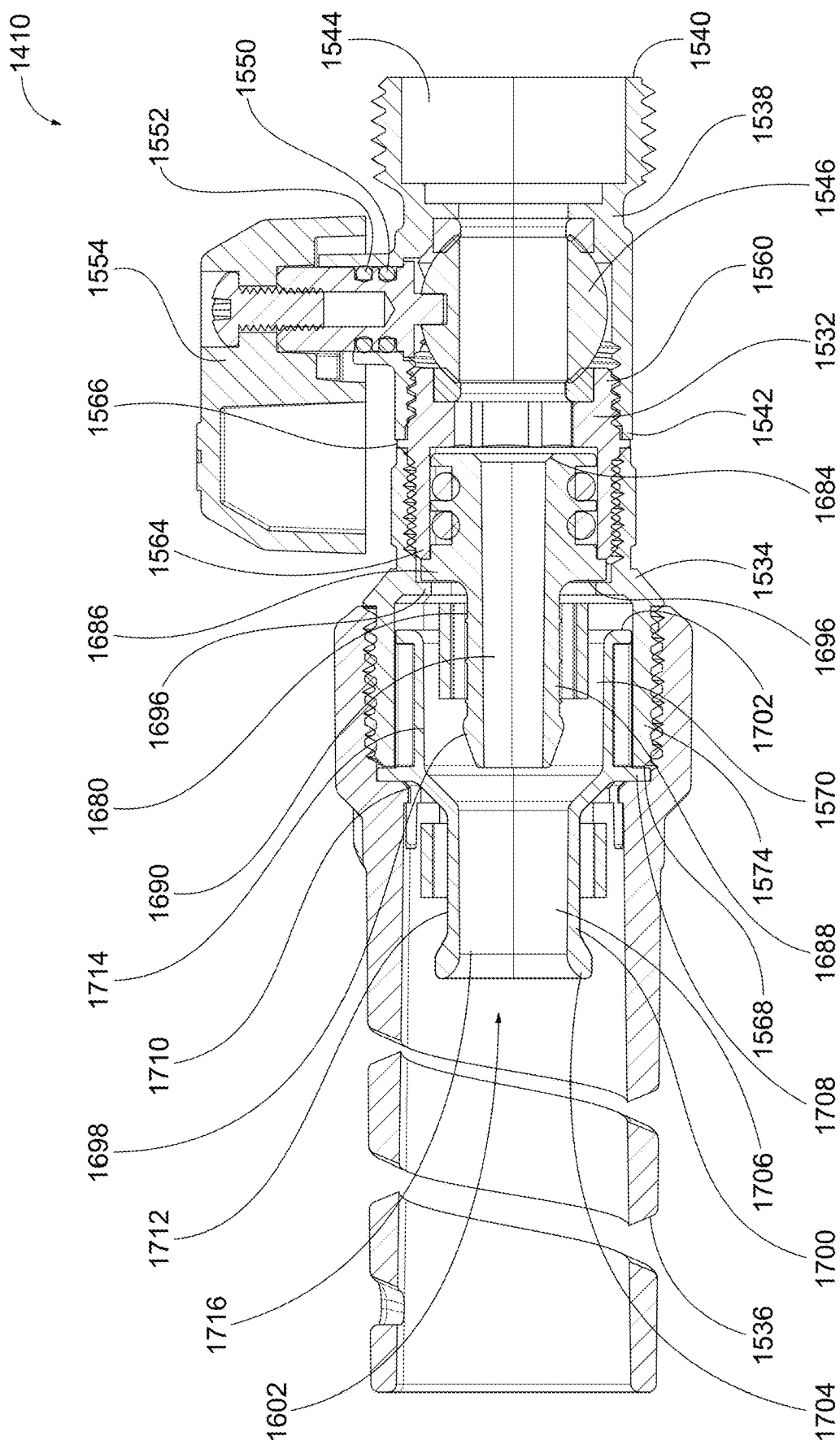
FIG. 23 is a cross-sectional view of the assembly of FIG. 21.

With continued reference to FIGS. 21 and 23, the second connector assembly 1418 will be described in detail. The second connector assembly 1418 includes a ball valve assembly 1530, a spacer 1532 connected to the ball valve assembly 1530, a sleeve connector 1534 connected to the spacer 132, and a strain relief sleeve 1536 connected to sleeve connector 1534. The ball valve assembly 1530 includes a body 1538 with a first end 1540 for connecting to a nozzle, sprinkler, etc., for example by a threaded connection, a second end 1542 for connecting to the spacer 1532, and a passage 1544 extending between the first and second ends 1540 and 1542. Disposed in the passage 1544 is a ball valve 1546 movable from a closed position blocking flow through the passage 1544 to an open position allowing flow through the passage 1544, and a number of positions therebetween. The ball valve 1546 is rotated by a stem 148 sealed to the body 1538 by suitable seals, and the stem 1548 is rotated by a lever 1554 coupled to the stem 1548 in a suitable manner, such as by a fastener.

The spacer 1532 has a first end 1560 connected to the second end 1542 of the body 1538 in a suitable manner, such as by a threaded connection, and sealed thereto by a suitable seal, and a second end 1564 connected to a first end 1566 of the sleeve connector 1534 in a suitable manner, such as by a threaded connection.

The sleeve connector 1534 has the first end 1566, a second end 1568 connected to the strain relief sleeve 1536, and a passage 1570 extending between the first and second ends 1566 and 1568. A shoulder 1572 is defined in the passage 1570 for retaining a tube connector 1680. The second end 1668 may be connected to the strain relief sleeve 1636 in a suitable manner, such as by a threaded connection.

Referring now to the hose assembly, the hose assembly includes a first hose connector assembly 1600, a second hose connector assembly 1602, an inner hose member, and an outer hose member 1606 surrounding the inner hose member. The first hose connector assembly 1600 includes a tube connector 1620, a collar 1622, a first retainer 1624, and a second retainer 1626. The tube connector 1620 includes a base 1628 having a flanged portion 1630, an elongate portion 1632 extending from the base 1628 that has one or more ribs for gripping the inner hose, and a passage 1634 extending through the base 1628 and elongate portion 1632. The base 1628 is disposed within the second end 1452 of the outer housing 1440 and sealed thereto by one or more suitable seals, such as O-rings 1636 and 1638, and the flanged portion 1630 is held between second end 1452 of the outer housing 1440 and an inner surface of the strain relief sleeve 1434 to couple the tube connector 1620 to the first connector assembly 1416. The elongate portion 1632 receives the first end of the inner tube and includes a bulbous or radiused end 1640 over which the first end of the inner tube is received providing a rounded area to prevent rupture/tearing of the inner tube when bent. The first end of the inner tube is held on the elongate portion 1632 by the first retainer 1624, which may be a suitable clamp or the like. A sleeve, which may be a gasket, tape, mesh, or the like, may be provided between the inner tube and the retainer 1624 to provide protection to the inner tube at the connection point.

Turning now to the collar 1622, the collar 1622 surrounds the first end of the inner tube and the elongate portion 1632 and extends past the second end of the tube connector 1620 to provide a connection area for the outer jacket to prevent the outer jacket from wearing against the inner tube. The collar 1622 has first and second ends 1650 and 1652, a passage extending therebetween, a flanged portion 1656 at the first end 1650 held between the flanged portion 1630 of the tube connector 1620 and an inner ledge 1658 of the strain relief sleeve 1434, and a groove 1662 for receiving the first end of the jacket and the second retainer 1626 to couple the jacket to the collar 1622.

The passage includes a first portion having a first diameter for accommodating the inner tube, first retainer 1624, elongate portion 1632, and radiused end 1640, and a second portion having a second diameter less than the first diameter for accommodating the inner tube. The collar 1622 curves outward at the second end 1652 providing a smooth area for the inner tube to contact when expanded to prevent the collar 1622 from biting into the inner tube.

Referring again to FIG. 23, the second hose connector assembly 1602 will be described in detail. The second hose connector assembly 1602 includes a tube connector 1680, a collar 1700, a first retainer, and a second retainer. The tube connector 1680 may be made of a suitable material, such as nylon, and includes a base 1684 having a flanged portion 1686, an elongate portion 1688 extending from the base 1684, and a passage 1690 extending through the base 1684 and elongate portion 1688. The base 1684 is disposed within the spacer 1532 and sealed thereto by one or more suitable seals, and the flanged portion 1686 is held between the second end 1564 of the spacer 1532 and an inner ledge 1696 of the sleeve connector 1534 to couple the tube connector 1680 to the second connector assembly 1418. The elongate portion 1688 receives the second end of the inner tube and includes a bulbous or radiused end 1698 over which the second end of the inner tube is received to prevent rupture/ tearing of the inner tube when bent. The second end of the inner tube is held on the elongate portion 1688 by the first retainer, which may be a suitable clamp or the like. The tube connector 1680 may be sized proportionally to the tube connector 1620 for retraction. For example, the tube connector 1680 may have a cross-sectional area that is smaller than a cross-sectional area of the tube connector 1620 to prevent the hose from retracting under flow and to optimize retraction performance. In an embodiment, the cross-sectional area of the tube connector 1680 is about thirty percent less than the cross-sectional area of the tube connector 1620.

Turning now to the collar 1700 in detail, the collar 1700 surrounds the inner tube and elongate portion 1688 and extends past the elongate portion 1688 to provide a connection area for the outer jacket to prevent the outer jacket from wearing against the inner tube. The collar 1700 has first and second ends 1702 and 1704, a passage 1706 extending therebetween, a flanged portion 1708 held between the second end 1568 of the sleeve connector 1534 and an inner ledge 1710 of the strain relief sleeve and a groove 1712 for receiving the second end of the jacket and the second retainer to couple the jacket to the collar 1700.

The passage 1706 includes a first portion 1714 having a first diameter for accommodating the inner tube, first retainer, elongate portion 1688, and radiused end 1698, and a second portion 1716 having a second diameter less than the first diameter for accommodating the inner tube. The collar 1700 curves outward at the second end 1704 providing a smooth area for the inner tube to contact when expanded to prevent the collar 1700 from biting into the inner tube.

Although certain embodiments have been shown and described, it is understood that equivalents and modifications falling within the scope of the appended claims will occur to others who are skilled in the art upon the reading and understanding of this specification.

What is claimed is:

1. A connection assembly for connecting to inner and outer hoses, the connection assembly comprising:
    a first connector assembly including a fluid connector configured to be coupled to a spigot;
    a second connector assembly configured to be coupled to an attachment;
    a first hose connector assembly coupled to the first connector assembly and configured to be coupled to the inner and outer hoses, the first hose connector assembly including a first tube connector configured to be coupled to the inner hose and a first collar configured to be coupled to a first end of the outer hose, the first collar surrounding at least a portion of the first tube connector;
    a second hose connector assembly coupled to the second connector assembly and configured to be coupled to the inner and outer hoses, the second hose connector assembly including a second tube connector configured to be coupled to the inner hose and a second collar configured to be coupled to a second end of the outer hose, the second collar surrounding at least a portion of the second tube connector;
    a first retainer for holding the inner hose on the first tube connector;
    a second retainer for holding the outer hose on the first collar;
    a third retainer for holding the inner hose on the second tube connector; and
    a fourth retainer for holding the outer hose on the second collar,
    wherein the second tube connector has a cross-sectional area that is smaller than a cross-sectional area of the first tube connector.

2. The connection assembly according to claim 1, wherein the cross-sectional area of the second tube connector is about thirty percent less than the cross-sectional area of the first tube connector.

3. The connection assembly according to claim 1, wherein the first tube connector includes an elongate portion having a bulbous end over which a first end of the inner hose is configured to be received.

4. The connection assembly according to claim 1, wherein the second tube connector includes an elongate portion having a bulbous end over which a second end of the inner hose is configured to be received.

5. The connection assembly according to claim 1, wherein the first collar includes a passage having a first portion for accommodating the inner hose, the first retainer, and an elongate portion of the first tube connector and a second portion for accommodating the inner hose, and the second collar includes a passage having first a portion for accommodating the inner hose, the third retainer, and an elongate portion of the second tube connector and a second portion for accommodating the inner hose.

6. The connection assembly according to claim 5, wherein the first and second collars each curve outward at an end of the respective second portion.

7. The connection assembly according to claim 1, wherein the first connector assembly includes a regulator assembly configured to regulate a flow of fluid through the inner hose to reduce a pressure of the fluid, the regulator assembly being coupled to the fluid connector.

8. The connection assembly according to claim 7, wherein the regulator assembly includes a body having a first end coupled to the fluid connector and a second end coupled to the first hose connector assembly, a valve stem disposed in the body, and a valve seat disposed in the body, wherein the valve stem is biased in an open position and movable to a closed position against the valve seat blocking flow through the regulator assembly.

9. The connection assembly according to claim 1, wherein the first connector assembly additionally includes a strain relief sleeve coupled to the first connector assembly, the strain relief sleeve including an inner ledge, wherein a flanged portion of the first tube connector and a flanged portion of the first collar are held between the inner ledge and an end of the first connector assembly.

10. A connection assembly for connecting to inner and outer hoses, the connection assembly comprising:
    a first connector assembly including a fluid connector configured to be coupled to a spigot;
    a second connector assembly configured to be coupled to an attachment;
    a first hose connector assembly coupled to the first connector assembly and configured to be coupled to the inner and outer hoses, the first hose connector assembly including a first tube connector configured to be coupled to the inner hose and a first collar configured to be coupled to a first end of the outer hose, the first collar surrounding at least a portion of the first tube connector;
    a second hose connector assembly coupled to the second connector assembly and configured to be coupled to the inner and outer hoses, the second hose connector assembly including a second tube connector configured to be coupled to the inner hose and a second collar configured to be coupled to a second end of the outer hose, the second collar surrounding at least a portion of the second tube connector; and
    a strain relief sleeve coupled to the first connector assembly, the strain relief sleeve including an inner ledge,
    wherein a flanged portion of the first tube connector and a flanged portion of the first collar are held between the inner ledge and an end of the first connector assembly, and
    wherein the second tube connector has a cross-sectional area that is smaller than a cross-sectional area of the first tube connector.

11. The connection assembly according to claim 10, wherein the first connector assembly includes a regulator assembly configured to regulate a flow of fluid through the inner hose to reduce a pressure of the fluid, the regulator assembly being coupled to the fluid connector.

12. The connection assembly according to claim 11, wherein the regulator assembly includes a body having a first end coupled to the fluid connector and a second end coupled to the first hose connector assembly, a valve stem disposed in the body, and a valve seat disposed in the body, wherein the valve stem is biased in an open position and movable to a closed position against the valve seat blocking flow through the regulator assembly.

13. A connection assembly for connecting to inner and outer hoses, the connection assembly comprising:
    a first connector assembly including a fluid connector configured to be coupled to a spigot;
    a second connector assembly configured to be coupled to an attachment, the second connector assembly including a ball valve assembly, a spacer connected to the ball valve assembly, a sleeve connector connected to the spacer, and a strain relief sleeve connected to the sleeve connector;
    a second connector assembly configured to be coupled to an attachment;
    a first hose connector assembly coupled to the first connector assembly and configured to be coupled to the inner and outer hoses, the first hose connector assembly including a first tube connector configured to be coupled to the inner hose and a first collar configured to be coupled to a first end of the outer hose, the first collar surrounding at least a portion of the first tube connector; and
    a second hose connector assembly coupled to the second connector assembly and configured to be coupled to the inner and outer hoses, the second hose connector assembly including a second tube connector configured to be coupled to the inner hose and a second collar configured to be coupled to a second end of the outer hose, the second collar surrounding at least a portion of the second tube connector.

14. The connection assembly according to claim 13, wherein the strain relief sleeve and the sleeve connector each include an inner ledge, wherein a flanged portion of the second collar is held between the inner ledge of the strain relief sleeve and an end of the sleeve connector, and wherein a flanged portion of the second tube connector is held between the inner ledge of the sleeve connector and an end of the spacer.

15. The connection assembly according to claim 13, wherein the first connector assembly includes a regulator assembly configured to regulate a flow of fluid through the inner hose to reduce a pressure of the fluid, the regulator assembly being coupled to the fluid connector.

16. The connection assembly according to claim 15, wherein the regulator assembly includes a body having a first end coupled to the fluid connector and a second end coupled to the first hose connector assembly, a valve stem disposed in the body, and a valve seat disposed in the body, wherein the valve stem is biased in an open position and movable to a closed position against the valve seat blocking flow through the regulator assembly.

17. A hose comprising:
    a first connector assembly configured to be coupled to a spigot;
    a second connector assembly configured to be coupled to an attachment; and
    a hose assembly coupled to the first and second connector assemblies, the hose assembly including an inner hose member having first and second ends, an outer hose member having first and second ends, a first hose connector assembly coupled to the first ends of the inner hose member and outer hose member and the first connector assembly, and a second hose connector assembly coupled to the second ends of the inner hose member and outer hose member and the second connector assembly, the first hose connector assembly including a first tube connector coupled to the inner hose member and a first collar coupled to the outer hose member, and the second hose connector assembly including a second tube connector coupled to the inner hose member and a second collar coupled to the outer hose member, the first collar surrounding at least a portion of the first tube connector and the second collar surrounding at least a portion of the second tube connector, wherein the first and second collars each curve outward at ends attached to the outer hose member, and wherein the second tube connector has a cross-sectional area that is about thirty percent smaller than a cross-sectional area of the first tube connector.

18. The hose according to claim 17, wherein the first connector assembly includes a regulator assembly configured to regulate a flow of fluid through the inner hose to reduce a pressure of the fluid, and a fluid connector coupled to the regulator assembly for coupling to the spigot.

19. The hose according to claim 18, wherein the regulator assembly includes a body having a first end coupled to the fluid connector and a second end coupled to the first hose connector assembly, a valve stem disposed in the body, and a valve seat disposed in the body, wherein the valve stem is biased in an open position and movable to a closed position against the valve seat blocking flow through the regulator assembly.

20. The hose according to claim 17, wherein the first collar surrounds at least a portion of the first tube connector and the second collar surrounds at least a portion of the second tube connector.

\* \* \* \* \*